US00RE43103E

(19) United States
(12) Reissued Patent
Rozman et al.

(10) Patent Number: US RE43,103 E
(45) Date of Reissued Patent: Jan. 10, 2012

(54) SYSTEM AND METHOD FOR PROTECTING A COMPUTER SYSTEM FROM MALICIOUS SOFTWARE

(76) Inventors: Allen F. Rozman, Garland, TX (US); Alfonso J. Cioffi, Murphy, TX (US)

(21) Appl. No.: 12/854,149

(22) Filed: Aug. 10, 2010

Related U.S. Patent Documents

Reissue of:
(64) Patent No.: 7,484,247
Issued: Jan. 27, 2009
Appl. No.: 10/913,609
Filed: Aug. 7, 2004

(51) Int. Cl.

| | |
|---|---|
| ***G06F 11/00*** | (2006.01) |
| ***G06F 12/14*** | (2006.01) |
| ***G06F 12/16*** | (2006.01) |
| ***G08B 23/00*** | (2006.01) |
| *G06F 15/173* | (2006.01) |
| *H04L 29/06* | (2006.01) |

(52) U.S. Cl. ..... 726/23; 726/24; 709/225; 713/152
(58) Field of Classification Search ..... 726/23, 726/24; 709/225; 713/152
See application file for complete search history.

(56) References Cited

U.S. PATENT DOCUMENTS

| | | | | |
|---|---|---|---|---|
| 4,890,098 | A | 12/1989 | Dawes et al. | |
| 5,280,579 | A | 1/1994 | Nye | |
| 5,502,808 | A | 3/1996 | Goddard et al. | |
| 5,555,364 | A | 9/1996 | Goldstein | |
| 5,564,051 | A * | 10/1996 | Halliwell et al. | 1/1 |
| 5,666,030 | A | 9/1997 | Parson | |
| 5,673,403 | A * | 9/1997 | Brown et al. | 715/744 |
| 5,751,979 | A * | 5/1998 | McCrory | 715/803 |
| 5,826,013 | A | 10/1998 | Nachenberg | |
| 5,918,039 | A | 6/1999 | Buswell et al. | |
| 5,974,549 | A * | 10/1999 | Golan | 726/23 |
| 5,978,917 | A | 11/1999 | Chi | |
| 5,995,103 | A | 11/1999 | Ashe | |
| 6,091,412 | A | 7/2000 | Simonoff et al. | |
| 6,108,715 | A | 8/2000 | Leach et al. | |
| 6,134,661 | A | 10/2000 | Topp | |
| 6,167,522 | A | 12/2000 | Lee et al. | |
| 6,192,477 | B1 * | 2/2001 | Corthell | 726/11 |
| 6,199,181 | B1 * | 3/2001 | Rechef et al. | 714/38 |
| 6,216,112 | B1 | 4/2001 | Fuller et al. | |
| 6,275,938 | B1 | 8/2001 | Bond et al. | |

(Continued)

OTHER PUBLICATIONS

"Spyware, Adware, and Peer to Peer Networks; The Hidden Threat to Corporate Security" by Kevin Townsend, Pest Patrol, 2003.

(Continued)

*Primary Examiner* — Christian LaForgia
(74) *Attorney, Agent, or Firm* — Slater & Matsil, L.L.P.

(57) ABSTRACT

In a computer system, a first electronic data processor is communicatively coupled to a first memory space and a second memory space. A second electronic data processor is communicatively coupled the second memory space and to a network interface device. The second electronic data processor is capable of exchanging data across a network of one or more computers via the network interface device. A video processor is adapted to combine video data from the first and second electronic data processors and transmit the combined video data to a display terminal for displaying the combined video data in a windowed format. The computer system is configured such that a malware program downloaded from the network and executing on the second electronic data processor is incapable of initiating access to the first memory space.

51 Claims, 11 Drawing Sheets

U.S. PATENT DOCUMENTS 6,321,337 B1 11/2001 Reshef et al.
6,351,816 B1 2/2002 Mueller et al.
6,385,721 B1 * 5/2002 Puckette ..... 713/2
6,397,242 B1 5/2002 Devine et al.
6,401,134 B1 6/2002 Razavi et al.
6,433,794 B1 8/2002 Beadle et al.
6,438,600 B1 8/2002 Greenfield et al.
6,480,198 B2 11/2002 Kang
6,492,995 B1 12/2002 Atkin et al.
6,505,300 B2 1/2003 Chan et al.
6,507,904 B1 1/2003 Ellison et al.
6,507,948 B1 1/2003 Curtis et al.
6,546,554 B1 4/2003 Schmidt et al.
6,553,377 B1 4/2003 Eschelbeck et al.
6,578,140 B1 * 6/2003 Policard ..... 713/1
6,581,162 B1 6/2003 Angelo et al.
6,633,963 B1 10/2003 Ellison et al.
6,658,573 B1 12/2003 Bischof
6,663,000 B1 12/2003 Muttik et al.
6,678,712 B1 * 1/2004 McLaren et al. ..... 718/100
6,678,825 B1 1/2004 Ellison et al.
6,691,230 B1 2/2004 Bardon
6,735,700 B1 5/2004 Flint et al.
6,754,815 B1 * 6/2004 Ellison et al. ..... 713/1
6,757,685 B2 6/2004 Raffaele et al.
6,772,345 B1 8/2004 Shetty
6,804,780 B1 10/2004 Touboul
6,836,885 B1 12/2004 Buswell et al.
6,871,348 B1 * 3/2005 Cooper ..... 719/310
6,873,988 B2 3/2005 Herrmann et al.
6,880,110 B2 4/2005 Largman et al.
6,996,828 B1 * 2/2006 Kimura et al. ..... 719/319
7,013,484 B1 * 3/2006 Ellison et al. ..... 726/26
7,024,555 B2 * 4/2006 Kozuch et al. ..... 726/22
7,024,581 B1 * 4/2006 Wang et al. ..... 714/2
7,039,801 B2 * 5/2006 Narin ..... 713/152
7,062,672 B2 6/2006 Owhadi et al.
7,082,615 B1 * 7/2006 Ellison et al. ..... 726/26
7,085,928 B1 8/2006 Schmid et al.
7,096,381 B2 8/2006 Largman et al.
7,139,890 B2 11/2006 Moran et al.
7,146,305 B2 * 12/2006 van der Made ..... 703/22
7,146,640 B2 * 12/2006 Goodman et al. ..... 726/16
7,181,768 B1 2/2007 Ghosh et al.
7,191,469 B2 3/2007 Erlingsson
7,246,374 B1 7/2007 Simon et al.
7,260,839 B2 8/2007 Karasaki
7,284,274 B1 10/2007 Walls et al.
7,373,505 B2 5/2008 Seltzer et al.
7,401,230 B2 7/2008 Campbell et al.
7,421,689 B2 9/2008 Ross et al.
7,444,412 B2 10/2008 Owhadi
7,484,247 B2 * 1/2009 Rozman et al. ..... 726/34
7,565,522 B2 7/2009 Sastry et al.
7,577,871 B2 8/2009 Largman et al.
7,596,694 B1 9/2009 Karp et al.
7,650,493 B2 * 1/2010 Narin ..... 713/152
7,657,419 B2 * 2/2010 van der Made ..... 703/22
7,694,328 B2 4/2010 Joshi et al.
7,818,808 B1 * 10/2010 Neiger et al. ..... 726/26
7,849,310 B2 * 12/2010 Watt et al. ..... 713/164
7,854,008 B1 * 12/2010 Huang et al. ..... 726/24
2002/0002673 A1 * 1/2002 Narin ..... 713/152
2002/0066016 A1 5/2002 Riordan
2002/0174349 A1 11/2002 Wolff et al.
2003/0023857 A1 1/2003 Hinchliffe et al.
2003/0097591 A1 5/2003 Pham et al.
2003/0131152 A1 7/2003 Erlingsson
2003/0177397 A1 9/2003 Samman
2003/0221114 A1 * 11/2003 Hino et al. ..... 713/189
2004/0006706 A1 * 1/2004 Erlingsson ..... 713/200
2004/0006715 A1 1/2004 Skrepetos
2004/0034794 A1 2/2004 Mayer et al.
2004/0039944 A1 * 2/2004 Karasaki ..... 713/201
2004/0054588 A1 3/2004 Jacobs et al.
2004/0267929 A1 * 12/2004 Xie ..... 709/225
2005/0005153 A1 * 1/2005 Das et al. ..... 713/200
2005/0149726 A1 * 7/2005 Joshi et al. ..... 713/164
2005/0198692 A1 * 9/2005 Zurko et al. ..... 726/24
2005/0240810 A1 10/2005 Safford et al.
2006/0004667 A1 1/2006 Neil

OTHER PUBLICATIONS

"Beyond Viruses: Why Anti-Virus Software is No Longer Enough" by David Stang PhD, Pest Patrol, 2002.

"The Web: Threat or Menace?" from "Firewalls and Internet Security: Repelling the Wiley Hacker", Second Edition, Addison-Wesley, ISBN 0-201-63466-X, 2003.

"Architecture of Virtual Machines" by R. P. Goldberg, Honeywell Information Systems, Inc. and Harvard University Presented at the AFIPS National Computer Conference, New York, New York, Jun. 4-8, 1973.

"The Duality of Memory and Communication in the Implementation of a Multiprocessor Operating System." by Michael Young, Avadis Tevanian, Richard Rasheed, David Golub, Jeffery Eppinger, Jonathan Crew, William Bolosky, David Black and Robert Baron, Computer Science Department Carnegie-Mellon University Proceedings of the 11th Operating Systems Principles, Nov. 1987.

"Application-Controlled Physical Memory using External Page-Cache Management." by Keiran Harty and David R. Cheriton, Computer Science Department, Stanford University, 1992.

"Efficient Software-Based Fault Isolation." by Robert Wahbe, Steven Lucco, Thomas Anderson, Susan Graham, Computer Science Division University of California, Berkeley, SIGOPS 1993.

"TRON: Process-Specific File Protection for the UNIX Operating System." by Andrew Berman, Virgil Bourassa, Erik Selberg, Department of Computer Science and Engineering, University of Washington, Jan. 23, 1995.

"A Secure Environment for Untrusted Helper Applications (Confining the Wily Hacker)." by Ian Goldberg, David Wagner, Randi Thomas, and Eric Brewer, Computer Science Division, University of California, Berkeley, Sixth USENIX UNIX Security Symposium San Jose, California, Jul. 1996.

"Building Systems that Flexibly Control Downloaded Executable Context." by Trent Jaeger and Atul Prakash, Software Systems Research Lab, University of Michigan and Aviel D. Rubin, Security Research Group, Bellcore Sixth USENIX UNIX Security Symposium San Jose, California, Jul. 1996.

"Java Security: From HotJava to Netscape and Beyond." by Drew Dean, Edward W. Felten, Dan S. Wallach Department of Computer Science, Princeton University, Princeton, NJ 08544 1996 IEEE Symposium on Security and Privacy, Oakland, CA, May 6-8, 1996.

"A Sandbox Operating System Environment for Controlled Execution of Alien Code." by Asit Dan, Ajay Mohindra, Rajiv Ramaswami, and Dinkar Sitaram IBM Research Division T.J. Watson Research Center Yorktown Heights, New York RC 20742 (Feb. 20, 1997) Computer Science IBM Research Report.

"Vulnerability of Secure Web Browsers." by Flavio De Paoli, Andre Dos Santos, Richard Kemmerer Reliable Software Group Computer Science Department, University of California, Santa Barbara, 1997.

"Security of Web Browser Scripting Languages: Vulnerabilities, Attacks, and Remedies." by Vinod Anupam and Alain Mayer, Bell Laboratories, Lucent Technologies 7th USENIX Security Symposium San Antonio, Texas, Jan. 26-29, 1998.

"Virtual Memory in Contemporary Microprocessors." by Bruce Jacob University of Maryland and Trevor Mudge University of Michigan, IEEE Micro Jul.-Aug. 1998.

"Flexible Control of Downloaded Executable Content." by Trent Jaeger and Jochen Liedtke and Nayeem Islam, IBM Thomas J. Watson Research Center, and Atul Prakash University of Michigan, Ann Arbor ACM Transactions on Information and System Security, vol. 2, No. 2, May 1999, pp. 177-228.

"J2ME Building Blocks for Mobile Devices: White Paper on KVM and the Connected, Limited Device Configuration." Sun Microsystems May 19, 2000.

"User-level Resource-constrained Sandboxing" by Fangzhe Chang, Ayal Itzkovitz, and Vijay Karamcheti Department of Computer Science, Courant Institute of Mathematical Sciences, New York University USENIX Windows System Symposium, Aug. 2000.

"Verifying the EROS Confinement Mechanism" by Jonathan S. Shapiro and San Weber IBM T.J. Watson Research Center 0-7695-0665-8/00 2000 IEEE.
"WindowBox: A Simple Security Model for the Connected Desktop" by Dirk Balfanz, Princeton University and Daniel R. Simon, Microsoft Research, 2000.
"Building a Secure Web Browser" by Sotiris Ioannidis, Steven M. Bellovin, 2001 USENIX Annual Technical Conference Boston, Massachusetts, USA Jun. 25-30, 2001.
"Virtualizing I/O Devices on VMware Workstation's Hosted Virtual Machine Monitor" by Jeremy Sugerman, Ganesh Venkitachalam and Beng-Hong Lim, VMware, Inc. 3145 Porter Dr, Palo Alto, CA 943042001 USENIX Annual Technical Conference Boston, Massachusetts, USA Jun. 25-30, 2001.
"When Virtual Is Better Than Real" by Peter M. Chen and Brian D. Noble, Department of Electrical Engineering and Computer Science University of Michigan, 2001.
"A Flexible Containment Mechanism for Executing Untrusted Code" by David Peterson, Matt Bishop, and Raju Pandey, Department of Computer Science University of California, Davis USENIX Security Symposium San Francisco, California, USA Aug. 5-9, 2002.
"Software Security and Privacy Risks in Mobile E-Commerce" by Anup K. Ghosh and Tara M. Swaminatha, Communications of the ACM Feb. 2001 vol. 44, No. 2.
"ReVirt: Enabling Intrusion Analysis through Virtual-Machine Logging and Replay" by George W. Dunlap, Samuel T. King, Sukru Cinar, Murtaza A. Basrai, Peter M. Chen, Department of Electrical Engineering and Computer Science, University of Michigan Proceedings of the 2002 Symposium on Operating Systems Design and Implementation (OSDI).
"Trusted Paths for Browsers: An Open-Source Solution to Web Spoofing" by Zishuang (Eileen) Ye and Sean Smith Department of Computer Science Dartmouth College Technical Report TR2002-418 Feb. 4, 2002.
"User Interaction Design for Secure Systems" by Ka-Ping Yee Proceedings of the 4th International Conference on Information and Communications Security table of contents pp. 278-290, 2002, ISBN:3-540-00164-6.
Marc Stiegler and Mark Miller, Report Name: "A Capability Based Client: The Darpa Browser" Combex/Focused Research Topic 5/BAA-00-06-SNK, Nov. 18, 2002.
"A Virtual Machine Introspection Based Architecture for Intrusion Detection" by Tal Garfinkel and Mendel Rosenblum, Computer Science Department, Stanford University 2003.
"Terra: A Virtual Machine-Based Platform for Trusted Computing" by Tal Garfinkel, Ben Pfaff, Jim Chow, Dan Boner and Mendel Rosenblum, Computer Science Department, Stanford University SOSP'03, Oct. 19-22, 2003, Bolton Landing, New York, USA.
Microsoft® Virtual PC 2004 Technical Overview by Jerry Honeycutt Published Nov. 2003 http://download.microsoft.com/download/c/f/b/cfb100a7-463d-4b86-ad62- 064397178b4f/Virtual_PC_Technical_Overview.doc.
"Xen and the Art of Virtualization" by Paul Barham, Boris Dragovic, Keir Fraser, Steven Hand, Tim Harris, Alex Ho, Rolf Neugebaurey, Ian Pratt, Andrew Warfield University of Cambridge Computer Laboratory 15 JJ Thomson Avenue, Cambridge, UK, CB3 0FD SOSP'03, Oct. 19-22, 2003, Bolton Landing, New York, USA.
"Design of the EROS Trusted Window System" by Jonathan S. Shapiro, John Vanderburgh, Eric Northrup, Systems Research Laboratory Johns Hopkins University, and, David Chizmadia, Promia, Inc. 2004.
"Survey of System Virtualization Techniques." by Robert Rose Mar. 8, 2004.
White Paper: "Smart Phone Security Issues" by Luc Delpha and Maliha Rasheed, Cyber Risk Consulting Blackhat Briefings Europe May 2004.
T. Jaeger, A. D. Rubin, and A. Prakash. "Building systems that flexibly control downloaded executable content." In Proceedings of the 1996 USENIX Security Symposium, pp. 131-148, San Jose, Ca., 1996.
Nimisha V. Mehta, Karen R. Sollins, "Expanding and Extending the Security Features of Java." Proceedings of the 7th USENIX Security Symposium, San Antonio, Texas, Jan. 26-29, 1998.
David A. Wagner, "Janus: an approach for confinement of untrusted applications." Master's thesis, University of California, Berkeley, 1999.. Also available, Technical Report CSD-99-1056, UC Berkeley, Computer Science Division. http://www.cs.berkeley.edu/~daw/papers/janus-masters.ps.
Richard West and Jason Gloudon, "User-Level Sandboxing: a Safe and Efficient Mechanism for Extensibility", Technical Report, 2003-014, Boston University, Jun. 2003.
Shaya Potter, Jason Nieh, Dinesh Subhraveti, "Secure Isolation and Migration of Untrusted Legacy Applications." Columbia University Technical Report CUCS-005-04, Jan. 2004.
M. Schmid, F. Hill, A. Ghosh, "Protecting Data from Malicious Software." Annual Computer Security Applications Conference (ACSAC'02), Las Vegas, NV, Dec. 2002.
Valentin Razmov "Security in Untrusted Code Environments: Missing Pieces of the Puzzle." Dept. of Computer Science and Engineering, University of Washington, Mar. 30, 2002.
Sotiris Ioannidis and Steven M. Bellovin. "Sub-Operating Systems: A New Approach to Application Security." Technical Report MS-CIS-01-06, University of Pennsylvania, Feb. 2000.
Kevin Townsend; "Spyware, Adware, and Peer to Peer Networks; The Hidden Threat to Corporate Security" © Pest Patrol, 2003.
David Stang, PhD; "Beyond Viruses: Why Anti-Virus Software is No Longer Enough", © Pest Patrol 2002.
"The Web: Threat or Menace?" From "Firewalls and Internet Security: Repelling the Wiley Hacker", Second Edition, Addison-Wesley, ISBN 0-201-63466-X, 2003 ©.

* cited by examiner

SYSTEM AND METHOD FOR PROTECTING A COMPUTER SYSTEM FROM MALICIOUS SOFTWARE

Matter enclosed in heavy brackets [ ] appears in the original patent but forms no part of this reissue specification; matter printed in italics indicates the additions made by reissue.

*CROSS REFERENCE TO MULTIPLE REISSUE APPLICATIONS*

*This application is a reissue application of U.S. Pat. No. 7,484,247, entitled "System and Method for Protecting a Computer System from Malicious Software," issued on Jan. 29, 2009, and is related to a continuation application therefrom designated U.S. patent application Ser. No. 13/015,186 filed on Jan. 27, 2011, which are incorporated herein by reference. This application is also related to another reissue application designated U.S. patent application Ser. No. 12/720,147 from U.S. Pat. No. 7,484,247 filed on Mar. 9, 2010, and another reissue application designated U.S. patent application Ser. No. 12/720,207 from U.S. Pat. No. 7,484,247 filed on Mar. 9, 2010, which are incorporated herein by reference. This application is also related to another reissue application designated U.S. patent application Ser. No. 12/941,067 from U.S. Pat. No. 7,484,247 filed on Nov. 7, 2010, which is incorporated herein by reference.*

CROSS REFERENCE TO RELATED PATENTS AND APPLICATIONS

This application is related to the following U.S. patents and applications:

| U.S. Pat. No. or PUB application No. | Title | Inventor(s) |
|---|---|---|
| 5,826,013 | Polymorphic virus detection module. | Nachenberg |
| 5,978,917 | Detection and elimination of macro viruses. | Chi |
| 6,735,700 | Fast virus scanning using session stamping. | Flint, et al |
| 6,663,000 | Validating components of a malware scanner. | Muttik, et al. |
| 6,553,377 | System and process for maintaining a plurality of remote security applications using a modular framework in a distributed computing environment. | Eschelbeck, et al. |
| 6,216,112 | Method for software distribution and compensation with replenishable advertisements. | Fuller, et al. |
| 4,890,098 | Flexible window management on a computer display. | Dawes, et al. |
| 5,555,364 | Windowed computer display. | Goldstein |
| 5,666,030 | Multiple window generation in computer display. | Parson |
| 5,995,103 | Window grouping mechanism for creating, manipulating and displaying windows and window groups on a display screen of a computer system. | Ashe |
| 5,502,808 | Video graphics display system with adapter for display management based upon plural memory sources. | Goddard, et al. |
| 5,280,579 | Memory mapped interface between host computer and graphics system. | Nye |
| 5,918,039 | Method and apparatus for display of windowing application programs on a terminal. | Buswell, et al |
| 6,480,198 | Multi-function controller and method for a computer graphics display system. | Kang |

-continued

| U.S. Pat. No. or PUB application No. | Title | Inventor(s) |
|---|---|---|
| 6,167,522 | Method and apparatus for providing security for servers executing application programs received via a network | Lee, et al. |
| 6,199,181 | Method and system for maintaining restricted operating environments for application programs or operating systems. | Rechef, et al. |
| 6,275,938 | Security enhancement for untrusted executable code. | Bond, et al. |
| 6,321,337 | Method and system for protecting operations of trusted internal networks. | Reshef, et al. |
| 6,351,816 | System and method for securing a program's execution in a network environment. | Mueller, et al. |
| 6,546,554 | Browser-independent and automatic apparatus and method for receiving, installing and launching applications from a browser on a client computer. | Schmidt, et al. |
| 6,658,573 | Protecting resources in a distributed computer system. | Bischof, et al |
| 6,507,904 | Executing isolated mode instructions in a secure system running in privilege rings. | Ellison, et al. |
| 6,633,963 | Controlling access to multiple memory zones in an isolated execution environment. | Ellison, et al. |
| 6,678,825 | Controlling access to multiple isolated memories in an isolated execution environment. | Ellison, et al. |
| 5,751,979 | Video hardware for protected, multiprocessing systems. | McCrory |
| 6,581,162 | Method for securely creating, storing and using encryption keys in a computer system. | Angelo, et al. |
| 6,134,661 | Computer network security device and method. | Topp |
| 6,578,140 | Personal computer having a master computer system and in internet computer system and monitoring a condition of said master and internet computer systems | Policard |
| PUB Application # 20040054588 | E-mail software and method and system for distributing advertisements to client devices that have such e-mail software installed thereon. | Jacobs, Paul E., et al. |
| PUB Application # 20040034794 | System and method for comprehensive general generic protection for computers against malicious programs that may steal information and/or cause damages | Mayer, Yaron; et al. |
| PUB Application # 20040006715 | System and method for providing security to a remote computer over a network browser interface. | Skrepetos, Nicholas C. |
| PUB Application # 20030177397 | Virus protection in an internet environment. | Samman, Ben |
| PUB Application # 20030097591 | System and method for protecting computer users from web sites hosting computer viruses. | Pham, Khai; et al. |
| PUB Application # 20030023857 | Malware infection suppression. | Hinchliffe, Alexander James; et al. |
| PUB Application # 20020066016 | Access control for computers. | Riordan, James |
| PUB Application # 20020174349 | Detecting malicious alteration of stored computer files. | Wolff, Daniel Joseph; et al. |

The above-listed U.S. Patents and U.S. patent applications are incorporated by reference as if reproduced herein in their entirety.

TECHNICAL FIELD

The present invention relates generally to computer hardware and software, and more particularly to a system and method for protecting a computer system from malicious software.

BACKGROUND

The very popular and ubiquitous rise of the 'personal' computer system as an essential business tool and home appliance, together with the exponential growth of the Internet as a means of providing information flows across a wide variety of connected computing devices, has changed the way people live and work. Information in the form of data files and executable software programs regularly flows across the planetary wide system of interconnected computers and data storage devices.

Popular and ubiquitous computer hardware and software architectures have typically been designed to allow for open interconnection via, for example, the internet, a VPN, a LAN, or a WAN, with information often capable of being freely shared between the interconnected computers. This open interconnection architecture has contributed to the adoption and mainstream usage of these computers and the subsequent interconnection of vast networks of computers. This easy to use system has given rise to the explosive popularity of applications such as email, internet browsing, search engines, interactive gaming, instant messaging, and many, many more.

Although there are definite benefits to this open interconnection architecture, a lack of security against unwanted incursions into the computers main processing and non-volatile memory space has emerged as a significant problem. An aspect of some current computer architectures that has contributed to the security problem is that by default programs are typically allowed to interact with and/or alter other programs and data files, including critical operating system files, such as the windows registry, for example. Current open interconnection architectures have opened the door to a new class of unwanted malicious software generally known a malware. This malware is capable of infiltrating any computer system which is connected to a network of interconnected computer systems. Malware is comprised of, but not limited to, classes of software files known as viruses, worms, Trojan horses, browser hijackers, adware, spyware, pop-up windows, data miners, etc. Such malware attacks are capable of stealing data by sending user keystrokes or information stored on a user's computer back to a host, changing data or destroying data on personal computers and/or servers and/or other computerized devices, especially through the Internet. In the least, these items represent a nuisance that interferes with the smooth operation of the computer system, and in the extreme, can lead to the unauthorized disclosure of confidential information stored on the computer system, significant degradation of computer system performance, or the complete collapse of computer system function.

Malware has recently become much more sophisticated and much more difficult for users to deal with. Once resident on a computer system, many malware programs are designed to protect themselves from deletion. For example, some malware programs comprise a pair of programs running simultaneously, with each program monitoring the other for deletion. If one of the pair of programs is deleted, the other program installs a replacement within milliseconds. In another example, some malware will run as a Windows program with a .dlls extension, which Windows may not allow a user to delete while it is executing. Malware may also reset a user's browser home page, change browser settings, or hijack search requests and direct such requests to another page or search engine. Further, the malware is often designed to defeat the user's attempts to reset the browser settings to their original values. In another example, some malware programs secretly record user input commands (such as keystrokes), then send the information back to a host computer. This type of malware is capable of stealing important user information, such as passwords, credit account numbers, etc.

Many existing computers rely on a special set of instructions which define an operating system (O/S) in order to provide an interface for computer programs and computer components such as the computer's memory and central processing unit (CPU). Many current operating systems have a multi-tasking capability which allows multiple computer programs to run simultaneously, with each program not having to wait for termination of another in order to execute instructions. Multi-tasking O/S's allow programs to execute simultaneously by allowing programs to share resources with other programs. For example, an operating system running multiple programs executing at the same time allows the programs to share the computer's CPU time. Programs which run on the same system, even if not simultaneously with other programs, share space on the same nonvolatile memory storage medium. Programs which are executing simultaneously are presently able to place binaries and data in the same physical memory at the same time, limited to a certain degree by the O/S restrictions and policy, to the extent that these are properly implemented. Memory segments are shared by programs being serviced by the O/S, in the same manner. O/S resources, such as threads, process tables and memory segments, are shared by programs executing simultaneously as well.

While allowing programs to share resources has many benefits, there are resulting security related ramifications, particularly regarding malware programs. Security problems include allowing the malware program: to capitalize CPU time, leaving other programs with little or no CPU time; to read, forge, write, delete or otherwise corrupt files created by other programs; to read, forge, write, delete or otherwise corrupt executable files of other programs, including the O/S itself; and to read and write memory locations used by other programs to thus corrupt execution of those programs.

In the case of a computer connected to the Internet, the computer may run an O/S, with several user applications, together comprising a known and trusted set of programs, concurrently with an Internet browser, possibly requiring the execution of downloaded code, such as Java applets, or EXE/COM executables, with the latter programs possibly containing malware. Many security features and products are being built by software manufacturers and by O/S programmers to prevent malware infiltrations from taking place, and to ensure the correct level of isolation between programs. Among these are architectural solutions such as rings-of-protection in which different trust levels are assigned to memory portions and tasks, paging which includes mapping of logical memory into physical portions or pages, allowing different tasks to have different mapping, with the pages having different trust levels, and segmentation which involves mapping logical memory into logical portions or segments, each segment having its own trust level wherein each task may reference a different set of segments. Since the sharing capabilities using traditional operating systems are extensive, so are the security features. However, the more complex the security mechanism is, the more options a malware practitioner has to bypass the security and to hack or corrupt other programs or the O/S itself, sometimes using these very features that allow sharing and communication between programs to do so.

Further, regarding malware programs, for virtually every software security mechanism, a malware practitioner has found a way to subvert, or hack around, the security system, allowing a malware program to cause harm to other programs in the shared environment. This includes every operating system and even the Java language, which was designed to create a standard interface, or sandbox, for Internet downloadable programs or applets.

Major vulnerabilities of existing computer systems lies in the architectures of the computer system and of the operating system itself. A typical multi-tasking O/S environment includes an O/S kernel loaded in the computer random access memory (RAM) at start-up of the computer. The O/S kernel is a minimal set of instructions which loads and off-loads resources and resource vectors into RAM as called upon by individual programs executing on the computer. Sometimes, when two or more executing programs require the same resource, such as printer output, for example, the O/S kernel leaves the resource loaded in RAM until all programs have finished with that resource. Other resources, such as disk read and write, are left in RAM while the operating system is running because such resources are more often used than others. The inherent problem with existing architectures is that resources, such as RAM, or a hard disk, are shared by programs simultaneously, giving a malware program a conduit to access and corrupt other programs, or the O/S itself through the shared resource. Furthermore, as many application programs are of a general nature, many features are enabled by default or by the O/S, thus in many cases bypassing the O/S security mechanism. Such is the case when a device driver or daemon is run by the O/S in kernel mode, which enables it unrestricted access to many if not all the resources.

The most common state-of the-art solutions for preventing malware infiltration are software based, such as blockers, sweepers and firewalls, for example, and hardware based solutions such as router/firewalls. Examples of software designed to counter malware are Norton Systems Works, distributed by the Symantec Corporation, Ad-aware, distributed by the Lavasoft Corporation of Sweeden, Spy Sweeper, distributed by the Webroot Software Corporation, Spyware Guard, distributed by Javacool Software LLC, among others. Currently there are a plethora of freeware, shareware and purchased software programs designed to counter malware by a variety of means. Such anti-malware programs are limited because they can only detect known malware that has already been identified (usually after the malware has already attacked one or more computers).

Network firewalls are typically based on packet filtering, which is limited in principle, since the rules determining which packets to accept and which to reject may contain subjective decisions based on trusting known sites or known applications. However, once security is breached for any reason (for example, due to a software or hardware error, a new piece of malware unrecognized by the anti-malware program or firewall, or an intended deception), a malicious application may take over the computer or server or possibly the entire network and create unlimited damages (directly or indirectly by opening the door to additional malicious applications).

The methods in the prior art are typically comprised of embedded software countermeasures that detect and filter unwanted intrusions in real time, or scan the computer system either at the direction of a user or as a scheduled event. Two problems arise from these methods. In the first instance, a comprehensive scan, detect, and elimination of malware from desired incoming data streams could significantly slow or preclude the interactive nature of many applications such a gaming, messaging, and browsing. In the second instance, newly implemented software screens may be quickly circumvented by malware practitioners who are determined to pass their files through the screen. Newly discovered malware leads to the development of additional screens, which lead to more malware, etc., thus creating an escalating cycle of measure, countermeasure. The basic flaw is that all incoming executable data files must be resident on the computers main processor to perform their desired function. Once resident on that processor, access may be gained to non-volatile memory and other basic computer system elements. Malware exploits this key architectural flaw to infiltrate and compromise computer systems.

The majority of these applications rely upon a scanning engine which searches suspect files for the presence of predetermined malware signatures. These signatures are held in a database which must be constantly updated to reflect the most recently identified malware. Typically, users regularly download replacement databases, either over the Internet, from a received e-mail, or from a CDROM or floppy disc. Users are also expected to update their software engines every so often in order to take advantage of new virus detection techniques (e.g. which may be required when a new strain of malware is detected).

Many of the aforementioned applications are also not effective against security holes, for example, in browsers or e-mail programs, or in the operating system itself. Security holes in critical applications are discovered quite often, and just keeping up with all the patches is cumbersome. Also, without proper generic protection against, for example, Trojan horses, even VPNs (Virtual Private Networks) and other forms of data encryption, including digital signatures, are not totally safe because information can be stolen before or below the encryption layer. Even personal firewalls are typically limited, because once a program is allowed to access the Internet, there are often few limitations on what files may be accessed and transmitted back to a host.

A major problem faced by computer users connected to a network is that the network interface program (a browser, for example) is resident on the same processor as the O/S and other trusted programs, and shares space on a common memory storage medium. Even with security designed into the O/S, malware practitioners have demonstrated great skill in circumventing software security measures to create malware capable of corrupting critical files on the shared memory storage medium. When this happens, users are often faced with a lengthy process of restoring their computer systems to the correct configuration, and often important files are simply lost because no backup exists.

Therefore, what is needed in the art is a means of isolating the network interface program from the main computer system such that the network interface program does not share a common memory storage area with other trusted programs. The network interface program may be advantageously given access to a separate, protected memory area, while being unable to initiate access to the main computer's memory storage area. With the network interface program constrained in this way, malware programs are rendered unable to automatically corrupt critical system and user files located on the main memory storage area. If a malware infection occurs, a user would be able to completely clean the malware infection from the computer using a variety of methods. A user could simply delete all files contained in the protected memory area, and restore them from an image residing on the main memory area, for example.

Other discussions of malware, its effects on computer systems, techniques used by malware practitioners to install malware, and techniques for detection and removal, may be found in the published literature, and in some of the patents and applications previously incorporated by reference. Reference to malware may be found in a technical white paper entitled "Spyware, Adware, and Peer-to-Peer Networks: The Hidden Threat to Corporate Security.", by Kevin Townsend, © Pest Patrol Inc. 2003. Pest Patrol is a Carlisle; Pa. based developer of software security tools. Another reference is a technical white paper entitled "Beyond Viruses: Why anti-virus software is no longer enough." by David Stang, PhD, © Pest Patrol Inc. 2002. Yet another reference is "The Web: Threat or Menace?" from "Firewalls and Internet Security: Repelling the Wily Hacker", Second Edition, Addison-Wesley. ISBN 0-201-63466-X, Copyright 2003. The foregoing references are incorporated by reference as if reproduced herein in their entirety.

SUMMARY OF THE INVENTION

Embodiments of the present invention achieve technical advantages as a system and method for protecting a computer system from malicious software attacks via a network connection.

It is an object of the present invention to provide a computer system capable of preventing malware programs from automatically corrupting critical user and system files.

It is another object of the present invention to confine any malware infection that may occur to a separate, protected part of the computer system.

It is another object of the present invention to provide a user with an easy and comprehensive method of removing the malware infection, even if the user's anti-malware software is incapable of detecting and/or removing the malware infection.

It is another object of the present invention to provide a user with an easy and comprehensive method of restoring critical system and user files that may have been corrupted by a malware infection.

It is another object of the present invention to provide a computer system configured such that attempts by malware to record and report data entry by the computer user via input devices such as keyboards, mouse clicks, microphones, or any other data input devices are effectively blocked.

It is another object of the present invention to provide a computer system capable of executing instructions in a first logical process, wherein the first logical process is capable of accessing data contained in a first memory space and a second memory space.

It is another object of the present invention to provide a computer system capable of executing instructions in a second logical process, wherein the second logical process is capable of accessing data contained in the second memory space, the second logical process being further capable of exchanging data across a network of one or more computers.

It is another object of the present invention to provide a computer system capable of displaying, in a windowed format on a display terminal, data from the first logical process and the second logical process, wherein a video processor is adapted to combine data from the first and second logical processes and transmit the combined data to the display terminal It is another object of the present invention to provide a computer system configured such that a malware program downloaded from the network and executing as part of the second logical process is incapable of initiating access to the first memory space.

It is another object of the present invention to provide a computer system configured such that corrupted data files residing on the second memory space may be restored from an image residing on the first memory space.

It is another object of the present invention to provide a computer system configured such that data files residing on the second memory space may be automatically deleted when the second logical process is terminated.

It is another object of the present invention to provide a computer system configured such that the second electronic data processor and the video processor are co-located on a circuit card, the circuit card being communicatively coupled to the first electronic data processor.

These objects and other advantages are provided by a preferred embodiment of the present invention wherein a computer system comprising a first electronic data processor is communicatively coupled to a first memory space and to a second memory space, a second electronic data processor is communicatively coupled to the second memory space and to a network interface device, wherein the second electronic data processor is capable of exchanging data across a network of one or more computers via the network interface device, a video processor is adapted to combine video data from the first and second electronic data processors and transmit the combined video data to a display terminal for displaying the combined video data in a windowed format, wherein the computer system is configured such that a malware program downloaded from the network and executing on the second electronic data processor is incapable of initiating access to the first memory space.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE ILLUSTRATED EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
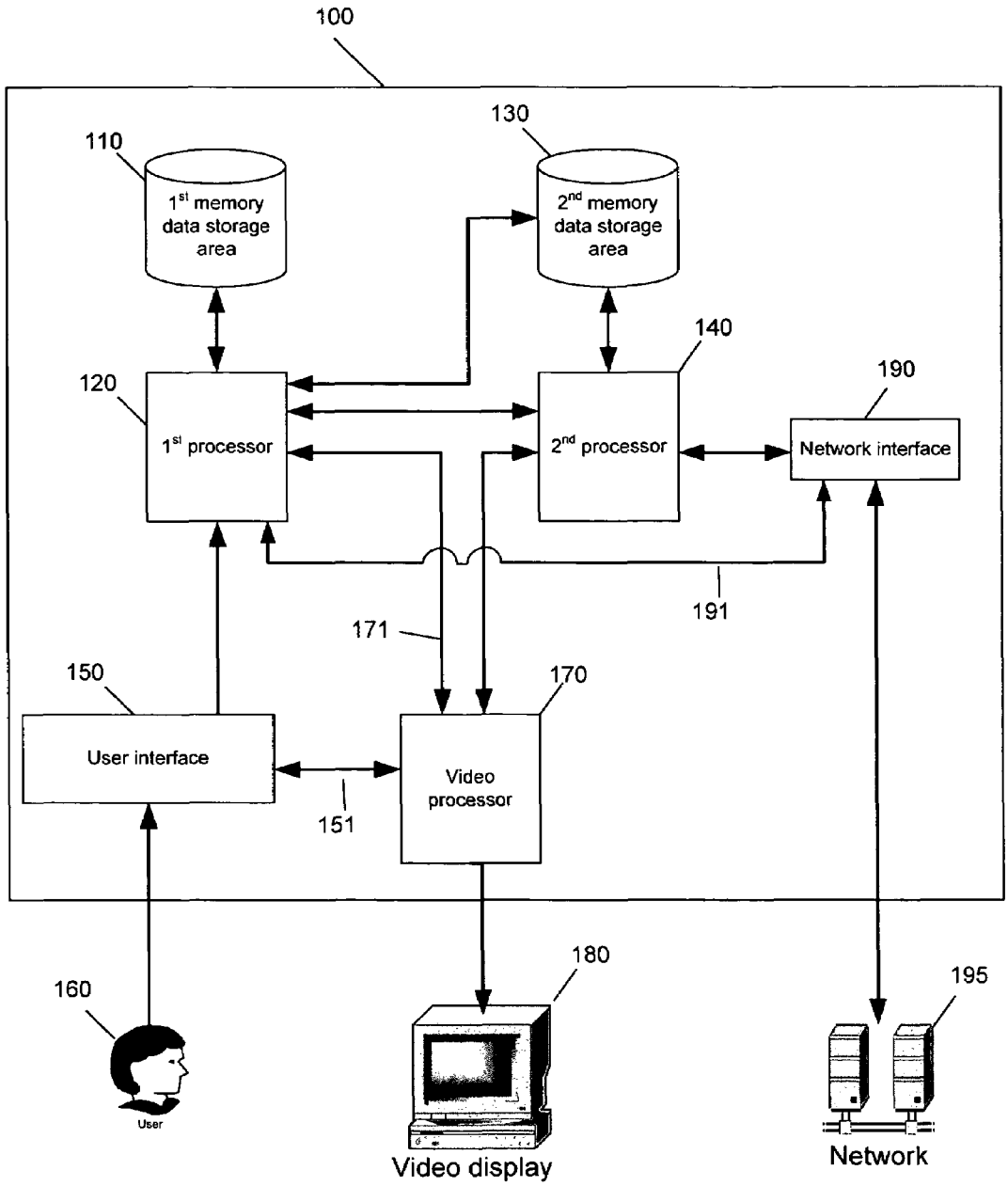
FIG. 1 illustrates a preferred embodiment of an exemplary computer system according to the principles of the present invention.

A computer system, constructed in accordance with a preferred embodiment of the present invention, is illustrated in FIG. 1. Computer system 100 may represent, for example, a personal computer (PC) system, a server, a portable computer, such as a notebook computer, or any data processing system, a personal digital assistant (PDA), a communication device such as a cell phone, or device that is capable of being connected to a network of one or more computers. System 100 comprises a first processor 120 (P1) communicatively coupled to a first memory and data storage area 110 (M1). P1 100 may comprise, for example, a microprocessor, such as a Pentium® 4 processor, manufactured by the Intel Corporation, or a Power PC® processor, manufactured by the IBM Corporation. Other electronic data processors manufactured by other companies, including but not limited to electronic data processors realized in Application Specific Integrated Circuits (ASICs) or in Field Programmable Gate Arrays (FPGAs), are within the spirit and scope of the present invention.

The first memory and data storage area 110 may comprise both volatile and nonvolatile memory devices, such as DRAMs and hard drives, respectively. Any memory structure and/or device capable of being communicatively coupled to P1 may be advantageously used in the present invention. M1 may be used to store, for example, critical operating system files, user data and applications, interim results of calculations, etc. The many uses of computer memory are well understood by those skilled in the art, and will not be discussed further here. One may refer to several of the aforementioned patents and applications incorporated by reference, in addition to other references, for a discussion of existing computer architectures and uses of computer memory. Also part of system 100 is user interface 150, which may comprise, for example, a keyboard, mouse or other pointing device, microphone, pen pad, etc. Any device or method capable of inputting commands and/or data from a user 160 to computer system 100 may be used to advantage. A video processor 170 is used to format information for display and transmit the display information to a video display device 180, which is viewed by user 160. Video processor 170 typically includes an associated video memory area, which may be dedicated to the video processor, or shared with other resources. It is understood in the art that the video processor 170 may be part of processor P1 120, in that it may be integrated onto the microprocessor chip. Video processor 170 may also comprise a processor IC located on a video graphics card, which is communicatively coupled to a computer motherboard. Additionally, video processor 170 may comprise circuitry located on the computer motherboard. Further still, functions of video processor 170 may be split between the processor, motherboard, or separate video graphics card.

It is often desirable to connect computer system 100 to a network of one or more computer devices 195, such as the Internet, a LAN, WAN, VPN, etc. This connection may be accomplished via network interface device 190, which may comprise, for example, a telephone modem, a cable modem, a DSL line, a router, gateway, hub, etc. Any device capable of interfacing with the network 195 may be used, via a wired connection, a wireless connection, or an optical connection, for example. Network interface device 190 may connect to network 195 through one or more additional network interface devices (not shown). For example, network interface device 190 may comprise a gateway or router, connected to a cable modem, with the cable modem connected to network 195. Of course, other configurations are within the spirit and scope of the present teachings.

In accordance with a preferred embodiment of the present invention, network 195 is isolated from the first processor 120 and memory 110 by a second processor 140 (P2). Second processor 140 may comprise any electronic data processor, such as the devices previously described as applicable to first processor 120. Communicatively coupled to P2 140 is second memory and data storage area 130 (M2), which may comprise any memory device or devices, such as the devices previously described as applicable to first memory 110.

The architecture of computer system 100 is designed to be capable of protecting memory 110 from malware initiated intrusions, and preventing malware from initiating unwanted processes on first processor 120. This is accomplished by using second processor 140 to isolate 110 and 120 from network 195. In a preferred embodiment, P2 140 is communicatively coupled to memory storage area M2 130, and may be configured such that P2 140 is incapable of initiating access to memory storage area M1 110. For example, P2 140 may be capable of accessing memory storage area M1 110 with the strict permission of user 160, either through a real time interaction or via stored configuration or commands. Such a configuration may be desirable in a multi-core or multi processor system, where user 160 may wish to use P2 140 in either a protected mode or an unprotected mode, depending on the application. However, user 160 is capable of denying P2 140 the capability of initiating access to memory storage area M1 110 without the user's permission. P1 120 is communicatively coupled to both memory areas M1 110 and M2 130, thereby enabling P1 120 to access data downloaded from the network 195. In the presently described embodiment, any malware that has intruded the 130-140 system is thus confined to the 130-140 system, and may be configured to be incapable of automatically corrupting data contained on M1 110, or of automatically initiating an unwanted process on P1 120.

Figure 2:
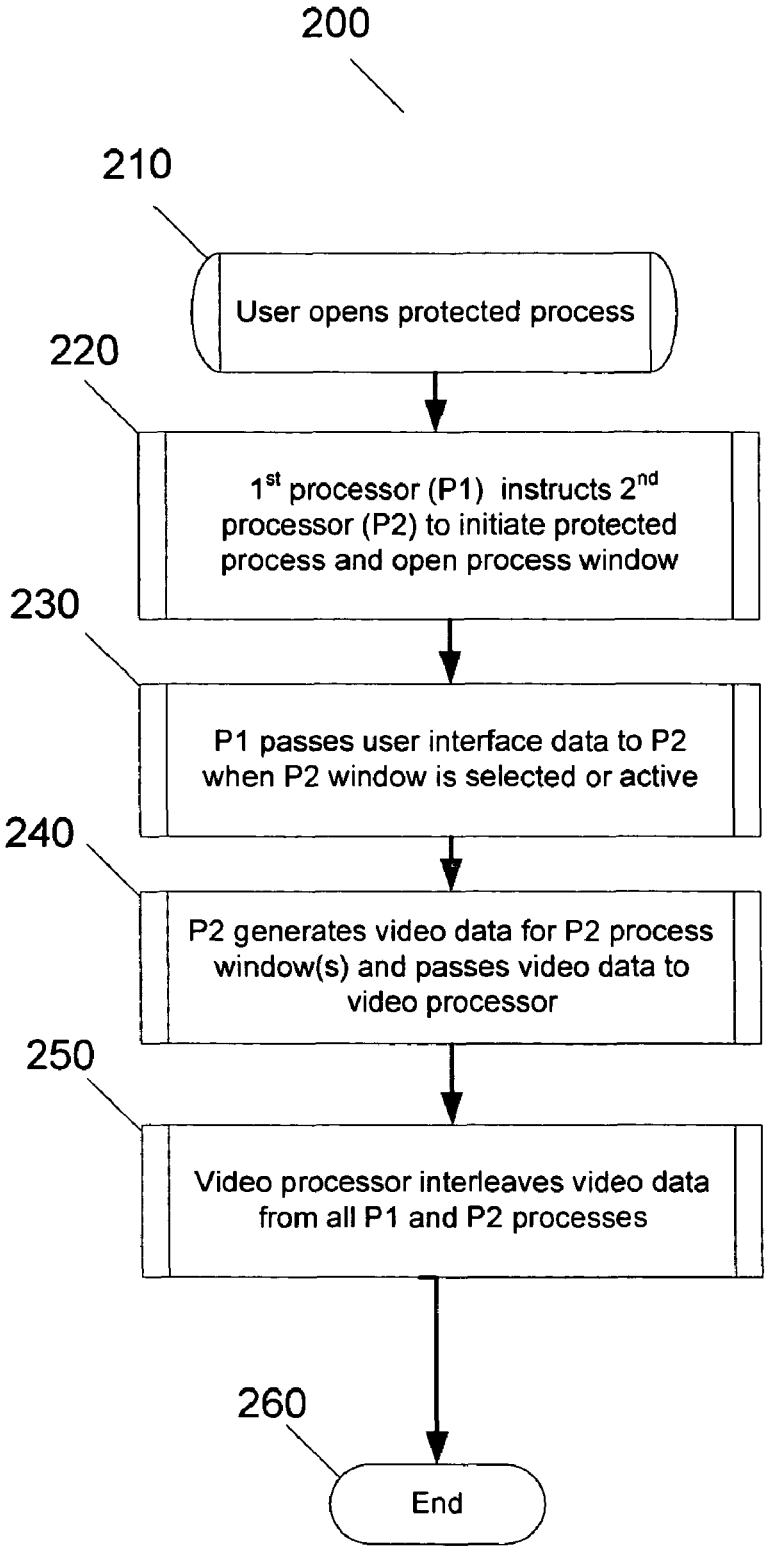
FIG. 2 illustrates a preferred embodiment of an exemplary protected process flow according to the principles of the present invention.

This and other features of the present teachings may be illustrated with reference to the example process flow 200 of FIG. 2. Computer user 160 wishes to connect to network 195 via for example, a browser program such as Internet Explorer or Netscape Navigator. Of course, other methods of connecting to network 195 may be used. User 160 inputs commands to open a protected process (e.g. a browser program in this example) at step 210. At step 220, $1^{st}$ processor 120 instructs $2^{nd}$ processor 140 to initiate the protected process and open one or more process windows. Second processor 140, in conjunction with memory 130, then interacts with the network 195 via network interface device 190, receiving and transmitting the data necessary to execute the desired protected process, such as browsing the internet or communication via e-mail. Second processor 140 and memory 130 act as a separate computer system, interacting with network 195 while isolating network 195 from the first processor 120 and memory 110. Memory 130 may store critical application and system files required by second processor 140 to execute the desired tasks. Memory 130 also stores data necessary to carry out the desired protected process. In the example of FIG. 2, first processor 120 receives user interface data from user 160, and passes user interface data to second processor 140 when the protected process window is selected or active, illustrated at step 230. User interface data, such as keystrokes for example, may be advantageously encrypted by P1 120 before passing the data to P2 140, with network interface device 190 possibly decrypting the data prior to transmitting the data to network 195. Encrypting, for example keystroke data, may disrupt the efforts of spyware programs designed to store user keystrokes for later transmission to a host computer. Second processor 140 generates video data for the protected process window(s) and passes the video data to video processor 170, for eventual display on video display 180, shown at step 240. Video processor 170 then interleaves the video data from all processes being executed by first processor 120 and second processor 140, at step 250. While there are many applicable methods for displaying video data from multiple sources, one such method was described in U.S. Pat. No. 5,751,979, entitled "Video hardware for protected, multiprocessing systems", previously incorporated by reference.

In accordance with a preferred embodiment of the present invention, if any malware is downloaded from network 195, it is stored in memory 130, and/or run as a process on second processor 140. In the configuration of computer system 100, any downloaded malware is rendered incapable of self initiating access to memory 110 or first processor 120, because second processor 140 is rendered incapable of initiating access to 110 and 120 without a direct or stored command from user 160. Any malware infection is thus confined. If a malware attack corrupts files and/or disrupts the operation of the 130-140 system, the user may easily shut down the corrupted process and restore the corrupted files from a protected image stored on memory 110, for example.

In accordance with a preferred embodiment of the present invention, the operating system controlling the 110-120 system may be different from an operating system controlling the protected 130-140 system. Conversely, a common operating system may control both the 110-120 system and the protected 130-140 system.

Figure 3:
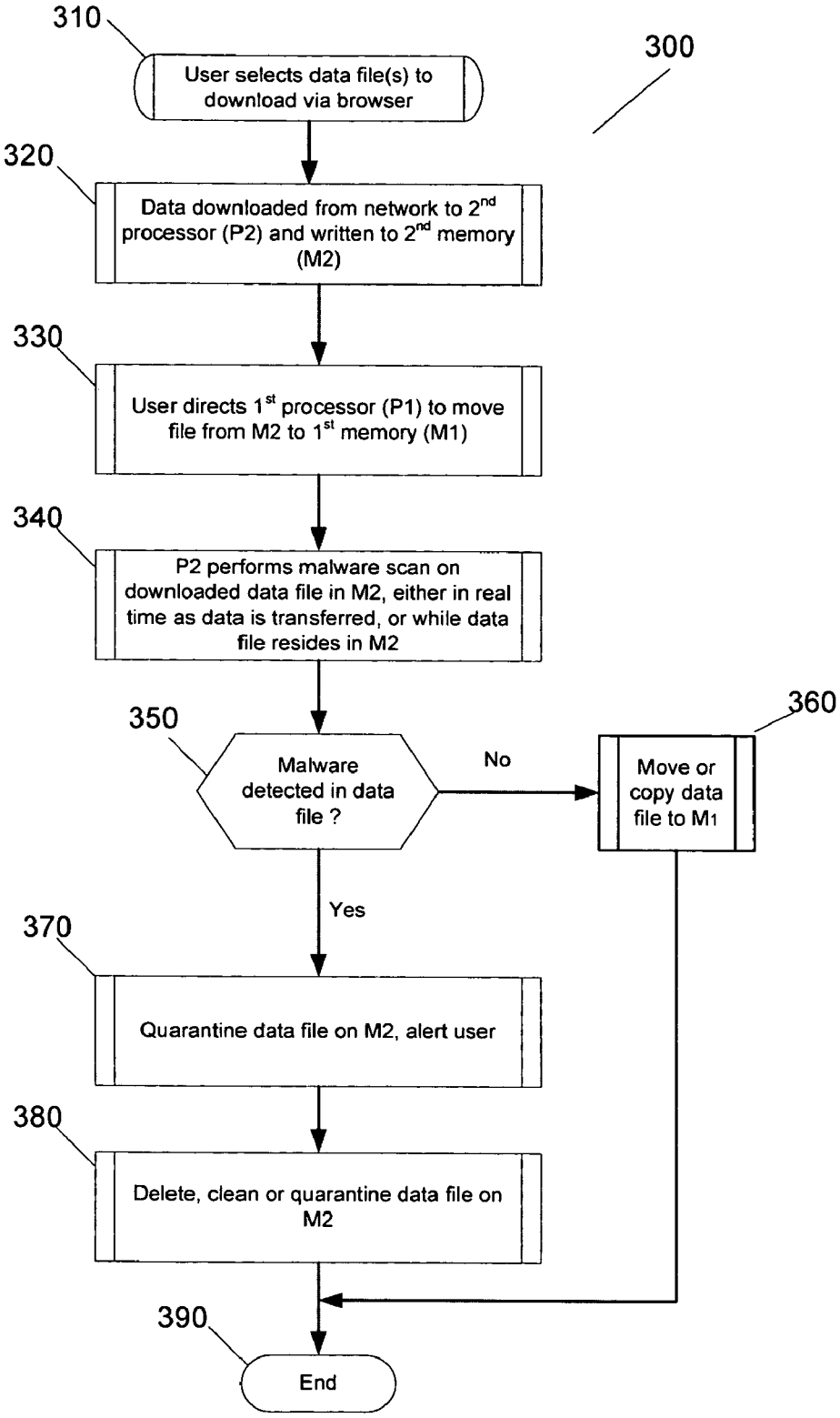
FIG. 3 illustrates a preferred embodiment of an exemplary file download process according to the principles of the present invention.

A user 160 may find it desirable to transfer files from the protected 130-140 system to the 110-120 system. User 160 may find it necessary, for example, to transfer an attachment from an e-mail message stored on memory 130 to the 110-120 system for further processing, modification, etc. In this case, the computer system 100 may go through a process whereby a file or other data is transferred from the 130-140 system to the 110-120 system, exemplified by the process 300 illustrated in FIG. 3.

In accordance with a preferred embodiment of the present invention, at step 310, user 160 selects one or more data files to download from network 195. The desired data is downloaded to the 130-140 system at step 320. The user 160 then directs computer system 100 to move the desired file(s) from the 130-140 system to the 110-120 system at step 330. P1 120 may then perform a malware scan on the desired files, either in real time as the data is being transferred, or while the data still resides in M2 130 (step 340). Alternatively, P2 140 may perform the malware scan. At step 350, processor P2 140 (or P1 120) determines if malware has been detected in the desired file(s), and thus P1 120 makes a decision. If no malware is detected, the file(s) are moved or copied onto M2 110 at step 360. If malware is detected, the data file(s) are quarantined on M2 130, and the data file(s), if transferred to M1 100, are erased or quarantined. Once malware is detected, the user 160 may be alerted of the detection (step 370). Either as a result of user input or stored configuration commands, the infected file(s) are deleted, cleaned, or quarantined on M2 130, at step 380.

The user 160 would of course understand the dangers inherent in transferring downloaded files from the 130-140 system to the 110-120 system. For example, the user's anti-malware software may not be up to date, or may simply be unable to detect certain types of malware. Also, the malware itself may be so new that the user's anti-malware definitions have not been updated as yet. Therefore the user may wish to keep the files on the 130-140 system for some period of time. Consequently, it may be desirable to have resident on the 130-140 system a variety of application software such as readers, thereby allowing the user to examine the files without risking transferring the files to the 110-120 system. These reader programs, such as Adobe Acrobat Reader, by the Adobe Systems Corporation, or Visio reader, by the Microsoft Corporation, are typically subset application programs of the full featured application programs, and may thus require far less memory space than the full application. Additionally, software companies often distribute the reader programs for free (or a nominal fee), thereby providing advertising for the full featured application in the hopes that it will be eventually purchased by the user. This reader application may be opened and executed on the 130-140 system in a manner similar to the process described in FIG. 2. Of course, a user 160 may also load a full application into the 130-140 system, enabling processing and modification of a downloaded file fully in the protected space, without risking a transfer of the file to the 110-120 system.

In the event the 130-140 system becomes infected with malware, the user 160 may wish to clean the 130-140 system. This cleaning may be accomplished by running an anti-malware application on the 130-140 system. However, if the infection is too severe for the anti-malware software to clean, or if the malware is undetectable by the user's anti-malware software, the user may wish to restore critical system files (or other user data files) for the 130-140 system from a protected image stored on M1 100, for example. It is of course understood that the critical system file image may be restored from another device, such as a removable drive or a CD, for example. The user may however consider it more convenient to restore the critical system files from an image on M1 100.

Figure 4:
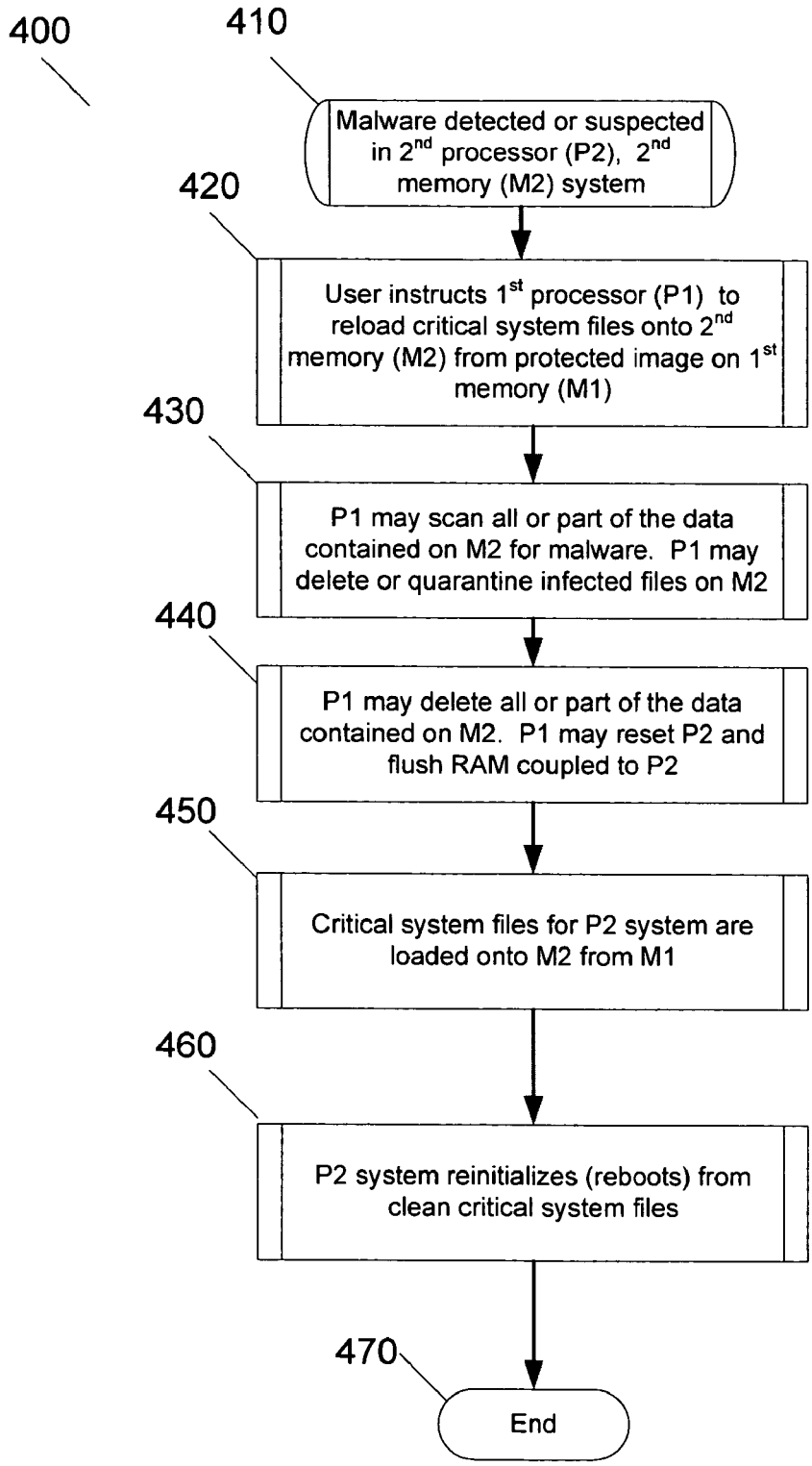
FIG. 4 illustrates a preferred embodiment of an exemplary memory restoration process according to the principles of the present invention.

In accordance with a preferred embodiment of the present invention, an exemplary process for restoring M2 130 from M1 110 is illustrated by process 400 in FIG. 4. At step 410, malware is detected or suspected to be infecting the 130-140 system. The user instructs P1 120 to reload critical system files onto M2 130 from a protected image on M1 110, at step 420. Depending on the severity of the infection, P1 120 may scan all or part of the data contained on M2 130 for malware, and may scan all processes currently running on P2 140. The scan may be initiated by direct instructions from the user, or by stored configuration commands, for example (step 430). P1 120 may delete all or part of the data contained on M2. P1 120 may also reset P2 140 and/or delete the contents of any RAM communicatively coupled to P2 140 (step 440). Once the 130-140 system has been adequately cleaned, clean critical system files are loaded onto M2 130 from any of the sources previously mentioned, preferably an image stored on M1 110 (step 450). The 130-140 may now be rebooted and/or reinitialized from the clean critical system files. In an extreme case where the malware resists deletion by the operating system, the user may elect to do a low level format on the M1 110 memory in order to ensure that the malware infection has been cleaned.

Figure 5A:
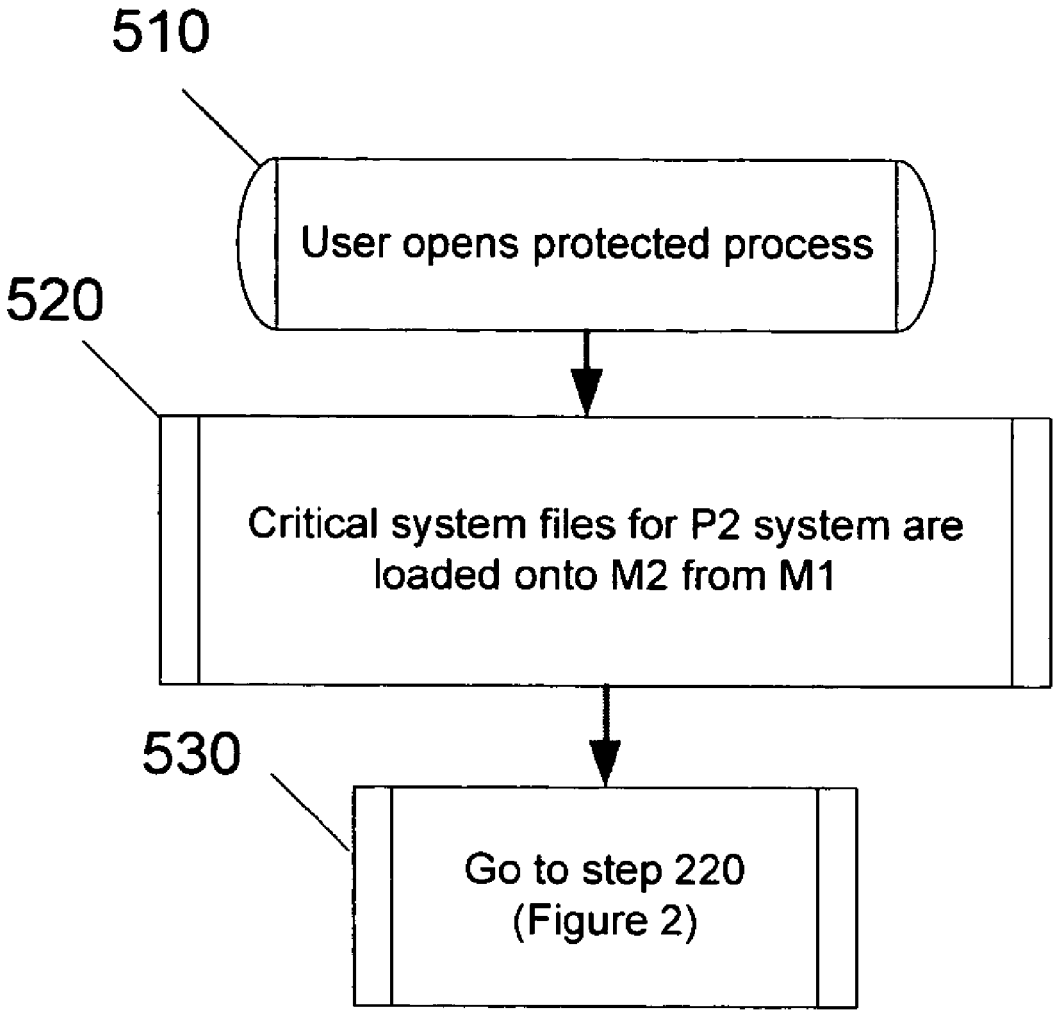
FIG. 5 illustrates a preferred embodiment of an exemplary automatic memory restoration and cleaning process according to the principles of the present invention.

In accordance with a preferred embodiment of the present invention, a user 160 may consider it advantageous for the 130-140 system to be automatically reinitialized from clean critical system files when a protected process window is opened. In this way, the new protected process is much less likely to be affected by an infection from a previous protected process session. Of course, a user may have a plurality of protected processes open and running during a protected process session. It may only be necessary to automatically reinitialize from clean critical system files when the first protected process is opened during a session. Subsequent protected processes may not require automatic re-initialization from clean critical system files. An exemplary automatic re-initialization from clean critical system files is illustrated by steps 510, 520 and 530 in FIG. 5a. Additionally, processes running on P2 140 may be automatically scanned and compared with an allowed process list, particularly as a protected process is started up. If any process is detected which is not on the allowed list, the user may be alerted that a possible malware infection has occurred. A user may then choose to scan or clean the system, or inspect the unknown process to determine if the process will be allowed to continue to execute. A user may also update the list of allowed processes from time to time as new, legitimate processes are added, for example, by a browser software update.

Figure 5B:
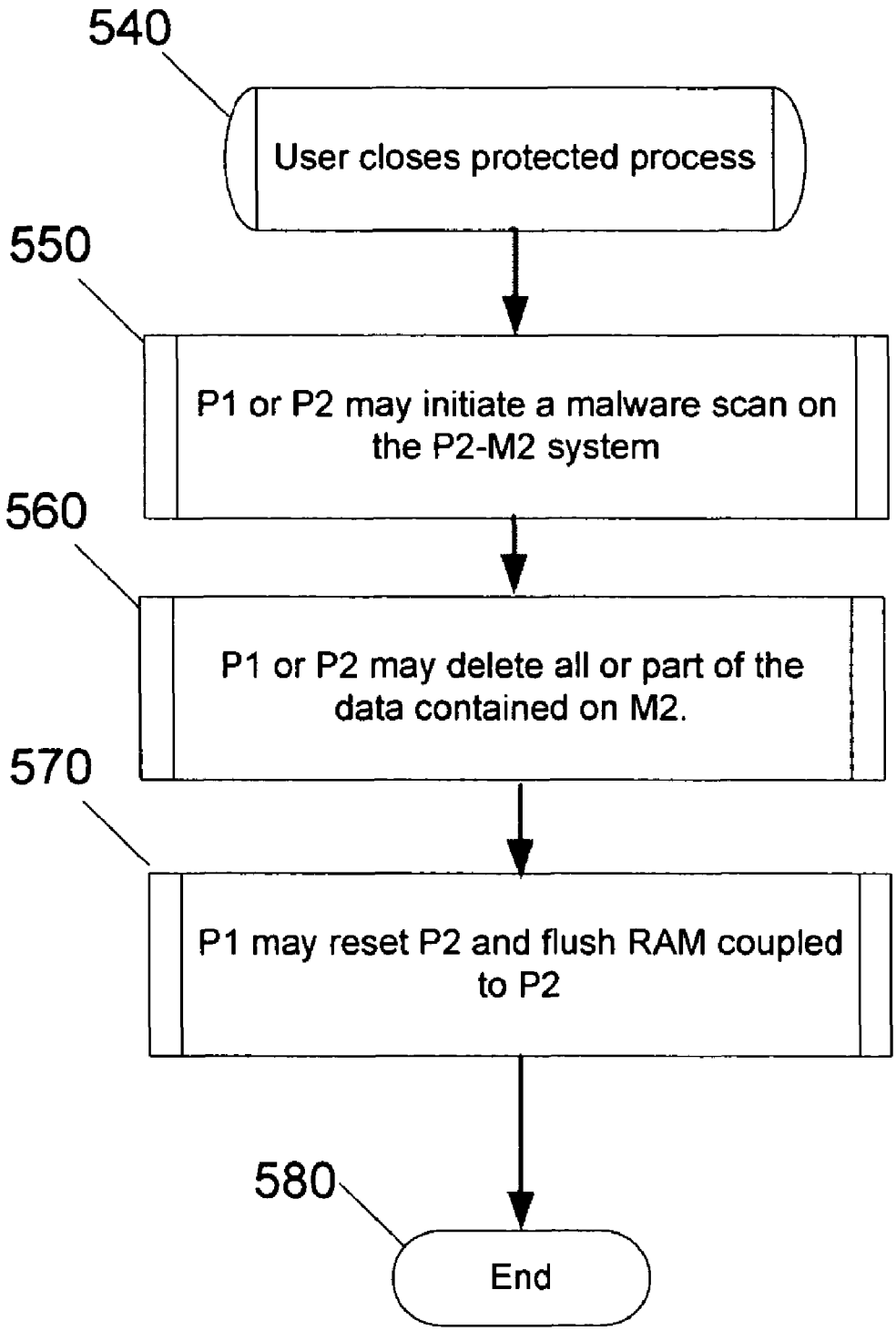

In accordance with a preferred embodiment of the present invention, a user 160 may consider it advantageous for the 130-140 system to be automatically cleaned when a protected process window is closed. In this way, any detected or undetected malware infections are much less likely to affect a future protected process session. It may only be necessary to automatically clean the 130-140 system when the last protected process is closed during a session. An exemplary automatic cleaning process is illustrated by steps 540, 550, 560, 570 and 580 in FIG. 5b. The memory M2 130 and processor P2 140 may be automatically scanned for malware infections as the protected process session closes. Infected files may be deleted or quarantined automatically. Additionally, there may be a variety of files that a user may wish to have automatically cleaned or deleted upon closing a protected process session. For example, temporary internet files, cookies, browser plug-ins, etc., may be deleted or scanned for malware automatically. A user may also wish to have websites that contributed to a malware infection noted, and may wish to place the offending websites in a block list, such that the offending websites cannot be accessed in the future without the user specifically authorizing access. As part of the malware scan, the malware scanner may automatically log the offending website(s), and block future access. Also, the P2 140 processor and any associated non-volatile memory may be reset and/or erased as the protected process session is closed. The exemplary automatic cleaning process illustrated in FIG. 5b may therefore reduce the risk of a malware infection being carried over to a future protected process session.

Interactive network processes such as interactive gaming have become very popular in recent years. In current interactive gaming processes, a user may log onto a game host located on network 195, or connect to other computers whose users wish to participate in the game. Computer games, such as Quake 3. Arena, by Id Software Incorporated, or Call of Duty, by Activision Incorporated, are just two examples of the plethora of games available that may be played interactively over a network. The user's computer system typically provides the bulk of the processing power and video graphics generation required to display the often fast moving and richly detailed three dimensional game environments. Information about the current and new state of the game is exchanged between various users' computer systems, often in real time. With this type of process, a relatively modest amount of data is required to be exchanged between users, or a user and the host, with the bulk of the processing, data manipulation, and graphics generation being handled by the user's local machine. However, this open network connection may become a conduit for malware practitioners to exploit, allowing malware to be downloaded onto a user's computer during a gaming session, often without the user being aware of the malware transfer. It would be advantageous, therefore, for a computer system to be much less susceptible to malware attacks during gaming sessions.

Figure 6:
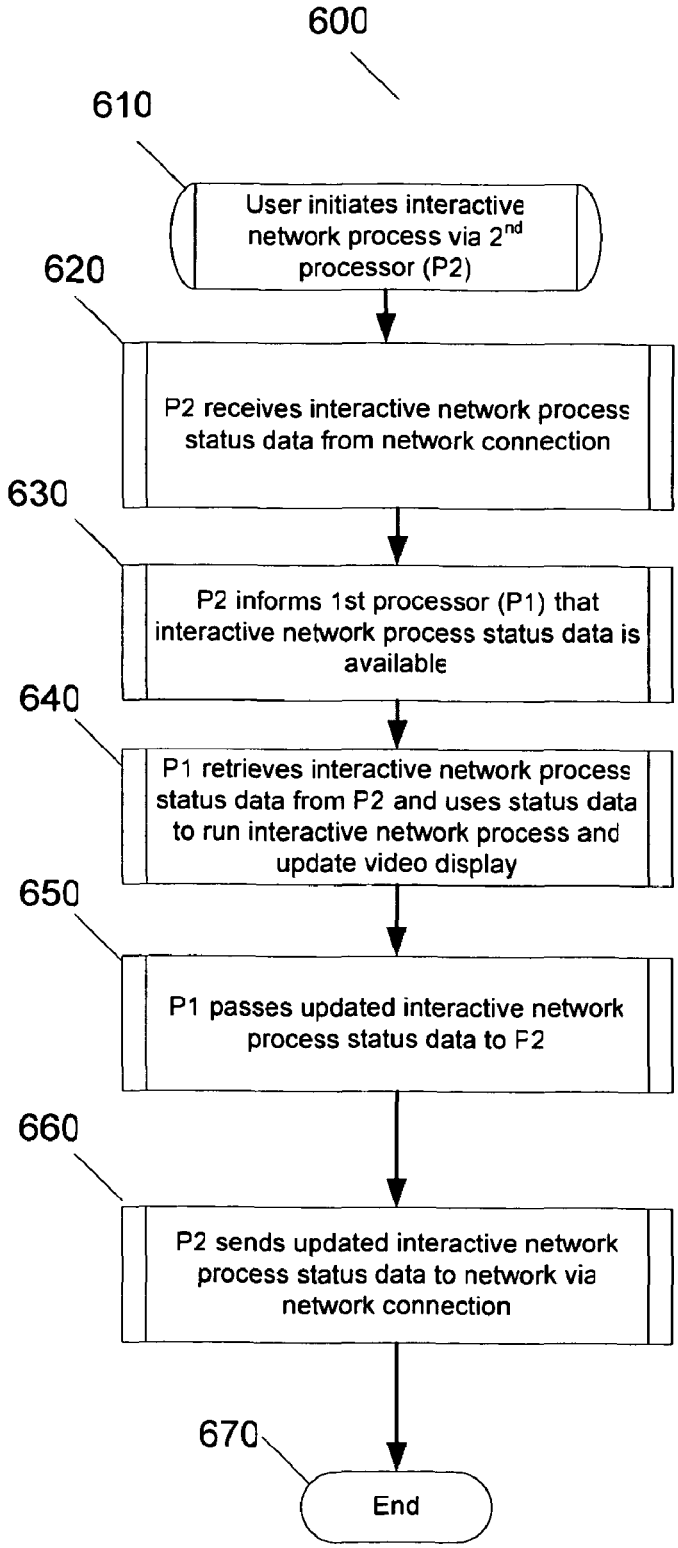
FIG. 6 illustrates a preferred embodiment of an exemplary interactive network process flow according to the principles of the present invention.

In accordance with a preferred embodiment of the present invention, an exemplary process flow 600, illustrated in FIG. 6, allows an interactive network process, such as online gaming, to be carried out on computer system 100. A user initiates an interactive network process via $2^{nd}$ processor P2 140 (step 610). P2 140 receives interactive network process status data from network connection (step 620). P2 140 informs 1st processor P1 120 that interactive network process status data is available (step 630). P1 120 retrieves interactive network process status data from P2 140 and uses the status data to update the interactive network process and update video display (step 640). P1 120 then passes the updated interactive network process status data to P2 140 (step 650). P2 140 then sends the updated interactive network process status data to the network via network connection 195 (step 660). The exemplary process 600, or a process functionally equivalent, is carried out continuously as long as the interactive process is running.

By using exemplary process 600 (or an equivalent), computer system 100 is capable of actively deciding what data to download and use, and what data to discard or scan for malware. The game status data is buffered prior to loading it onto the 110-120 system. The 110-120 system may be advantageously configured to only accept game status information in the proper format, thereby minimizing the chance that a malware practitioner could deceptively load malware onto the 110-120 system.

Additionally, computer system 100 could be configured such that system 130-140 is powerful enough to process the interactive network process without exchanging information with the 110-120 system. Such a configuration may be more secure, as a conduit between the 110-120 system and the 130-140 system may not be necessarily opened. The 130-140 system may contain all the necessary files to facilitate the interactive network process. Higher end computers, workstations, and servers often contain dual (or more) processors, such as the Mac G5, manufactured by the Apple Computer Corporation, or a single physical processor with a multiple processor core. Often, the processors in these multi-processor machines are of equal or comparable processing power. In such a configuration, one processor may be dedicated to performing functions equivalent to those described for P1 120, with a second processor performing the functions equivalent to those described for P2 140. A computer system 100 employing multiple processors may be advantageously configured such that one of the processors is dedicated to protected processes only when a network process is active. When a user is not accessing a network, the multiple processors in a computer system may be dedicated to other processes, such as performing complex calculations or simulations, or running complex non-network interactive gaming processes, for example. Alternatively, the computer system 100 may be configured such that the 110-120 system simply transfers required files to the video processor 170 or the 130-140 system at the appropriate time to facilitate the interactive network process. The 110-120 system could be commanded to retrieve and transfer the files at the command of the video processor, or at the command of the 130-140 system, or a combination of both.

Figure 7:
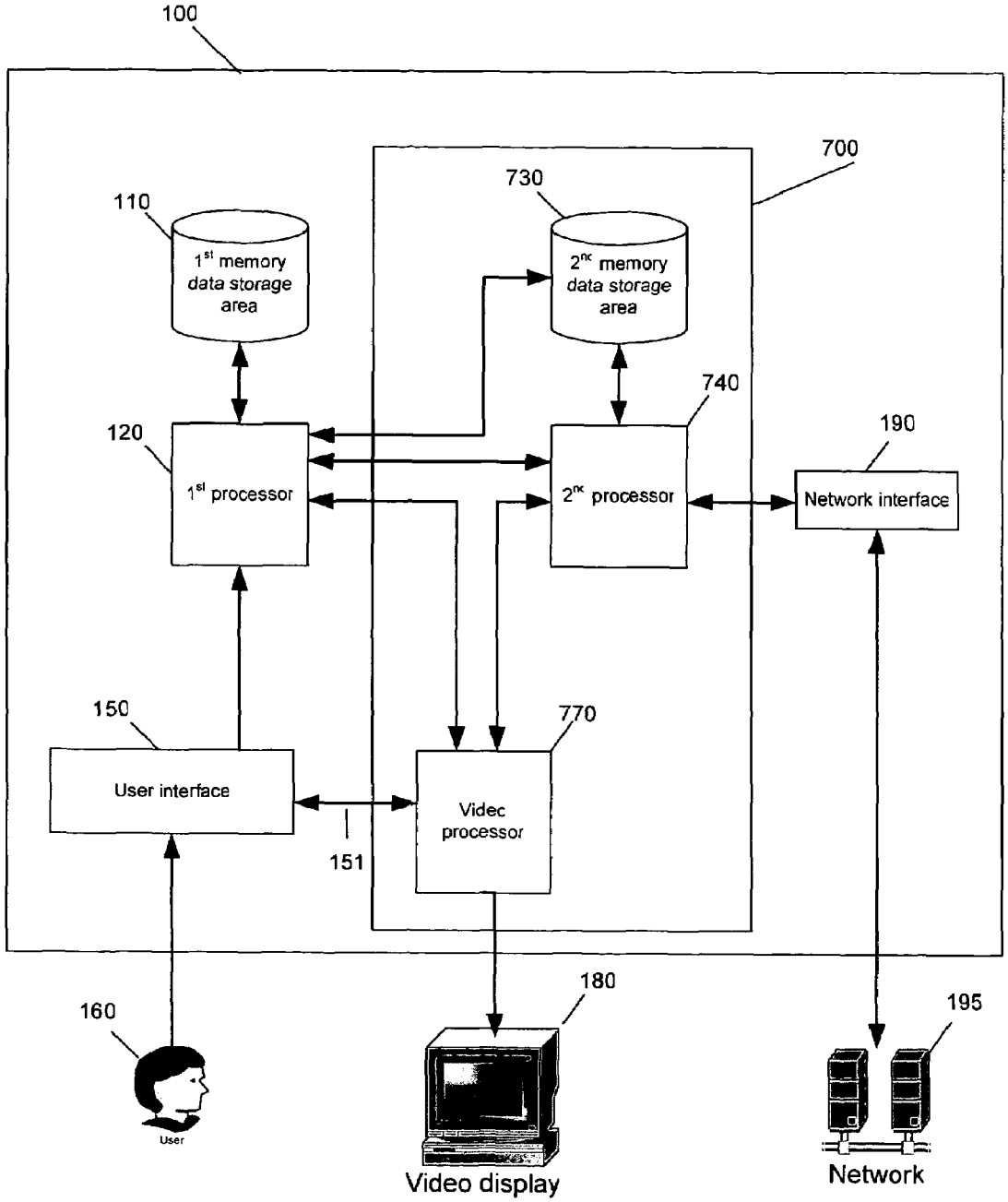
FIG. 7 illustrates a preferred embodiment of an exemplary computer system according to the principles of the present invention.

In accordance with embodiments of the present invention, computer system 100 may be configured in a variety of ways, while still remaining within the spirit and scope of the present teachings. One such exemplary embodiment is illustrated in FIG. 7. Subsystem 700 of computer system 100 comprises a video processor 770, a second processor 740, and a second memory data storage area 730. The demarcation line illustrated by subsystem 700 may be either physical or logical. For example, subsystem 700 may comprise an add-on card, such as a high end video card, or a video/network card. If configured in this exemplary manner, a user could upgrade an existing computer system to take advantage of the teachings of the present invention. Subsystem 700 may be plugged into the main motherboard of an existing computer, for example. The motherboard connector may be already communicatively coupled to the 110-120 system, thereby facilitating the system upgrade. The network interface device 190 may be connected directly to subsystem 700, or network interface device 190 could be integrated as part of subsystem 700. Memory data storage area 730 may comprise any of the volatile and/or non-volatile memory types previously described, or any combination thereof, or any suitable memory storage medium, for example. Alternatively, subsystem 700 may be located on the motherboard, as opposed to an add-on card. Further still, portions of subsystem 700, such as video processor 770, and/or second processor 740, for example, may be integrated together with P1 120. It is understood that functions described herein may be configured in a wide variety of ways, without departing from the spirit and scope of the present teachings.

Figure 8:
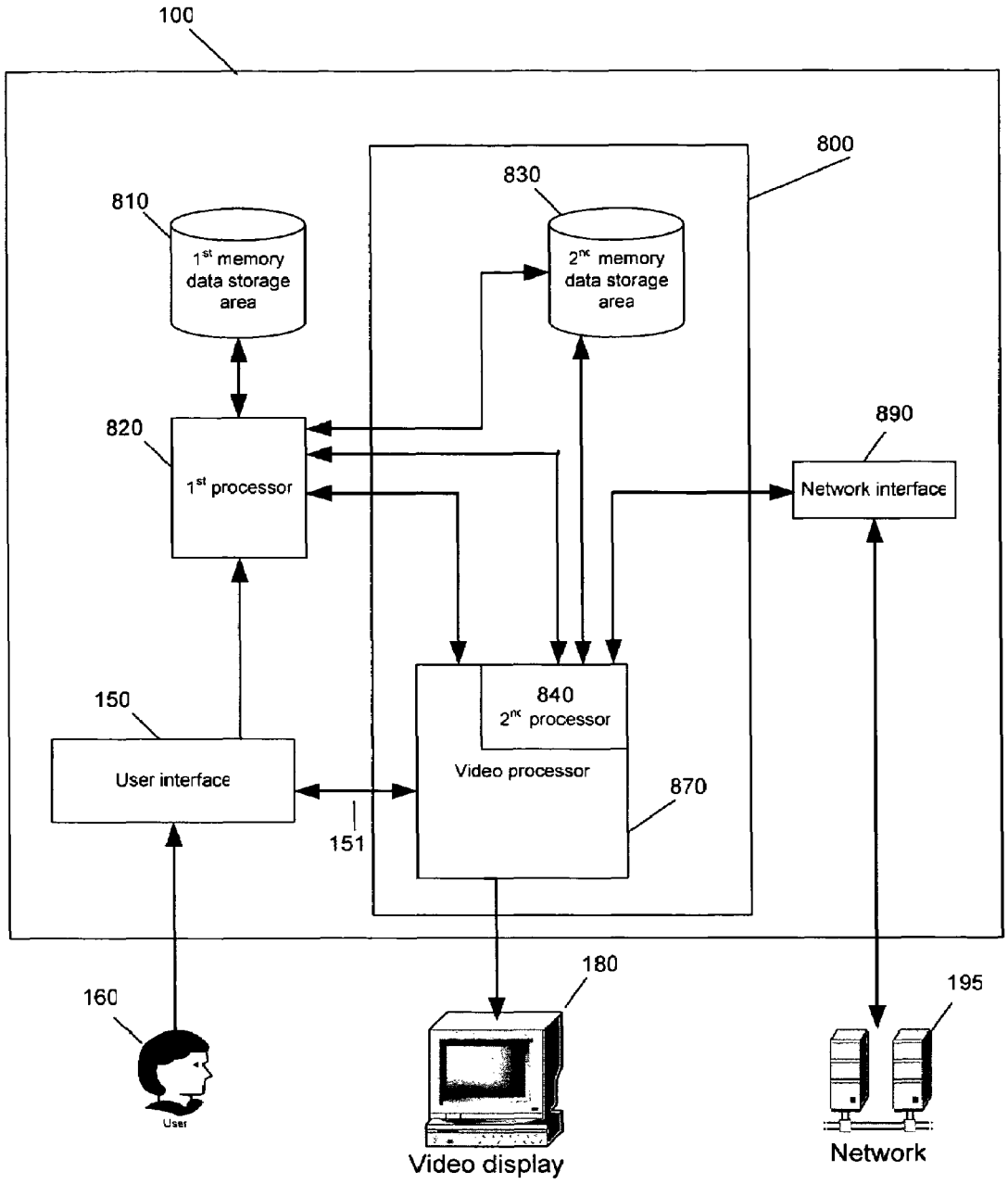
FIG. 8 illustrates a preferred embodiment of an exemplary computer system according to the principles of the present invention.

In accordance with a preferred embodiment of the present invention, an alternate configuration for computer system 100 is illustrated in FIG. 8. Subsystem 800 of computer system 100 comprises a video processor 870, a second processor 840, and a second memory data storage area 830. The demarcation line illustrated by subsystem 800 may be either physical or logical. For example, subsystem 800 may comprise an add-on card, such as a high end video card, or a video/network card. If configured in this exemplary manner, a user could upgrade an existing computer system to take advantage of features of the present invention. In the exemplary embodiment of FIG. 8, second processor 840 and video processor 870 are integrated together, perhaps on a common integrated circuit. Such a configuration may help to reduce the cost of subsystem 800, and/or improve the performance. Additionally, a circuit designer may find it advantageous to integrate 840 and 870 together to facilitate communication between the functions. It is understood that such an integration of functions may create a device in which an external user may find it difficult to distinguish where the function of 870 ends and the function of 840 begins, and vice versa. Such a device, however, would remain within the spirit and scope of the present teachings.

Figure 9:
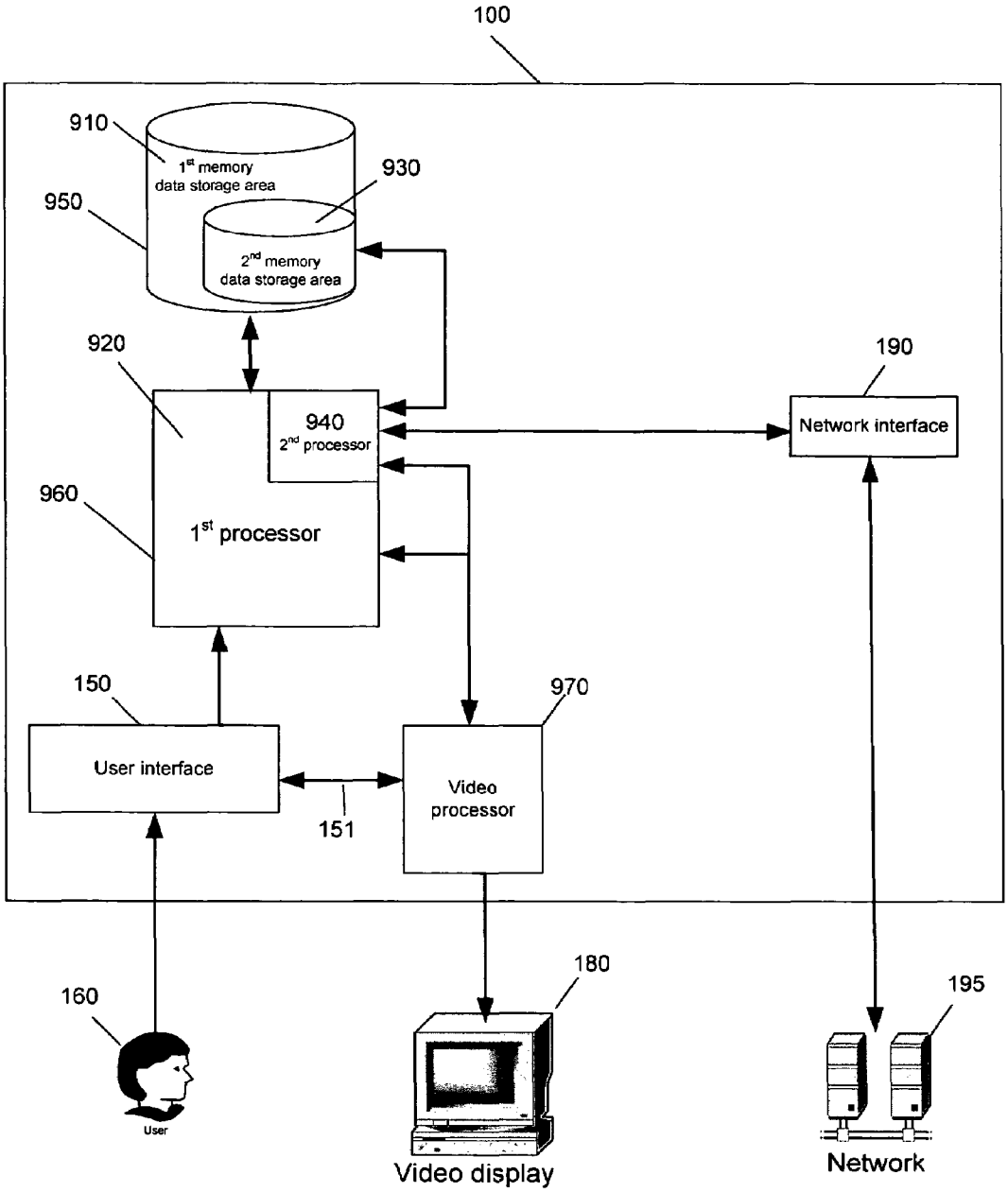
FIG. 9 illustrates a preferred embodiment of an exemplary computer system according to the principles of the present invention.
Figure 10:
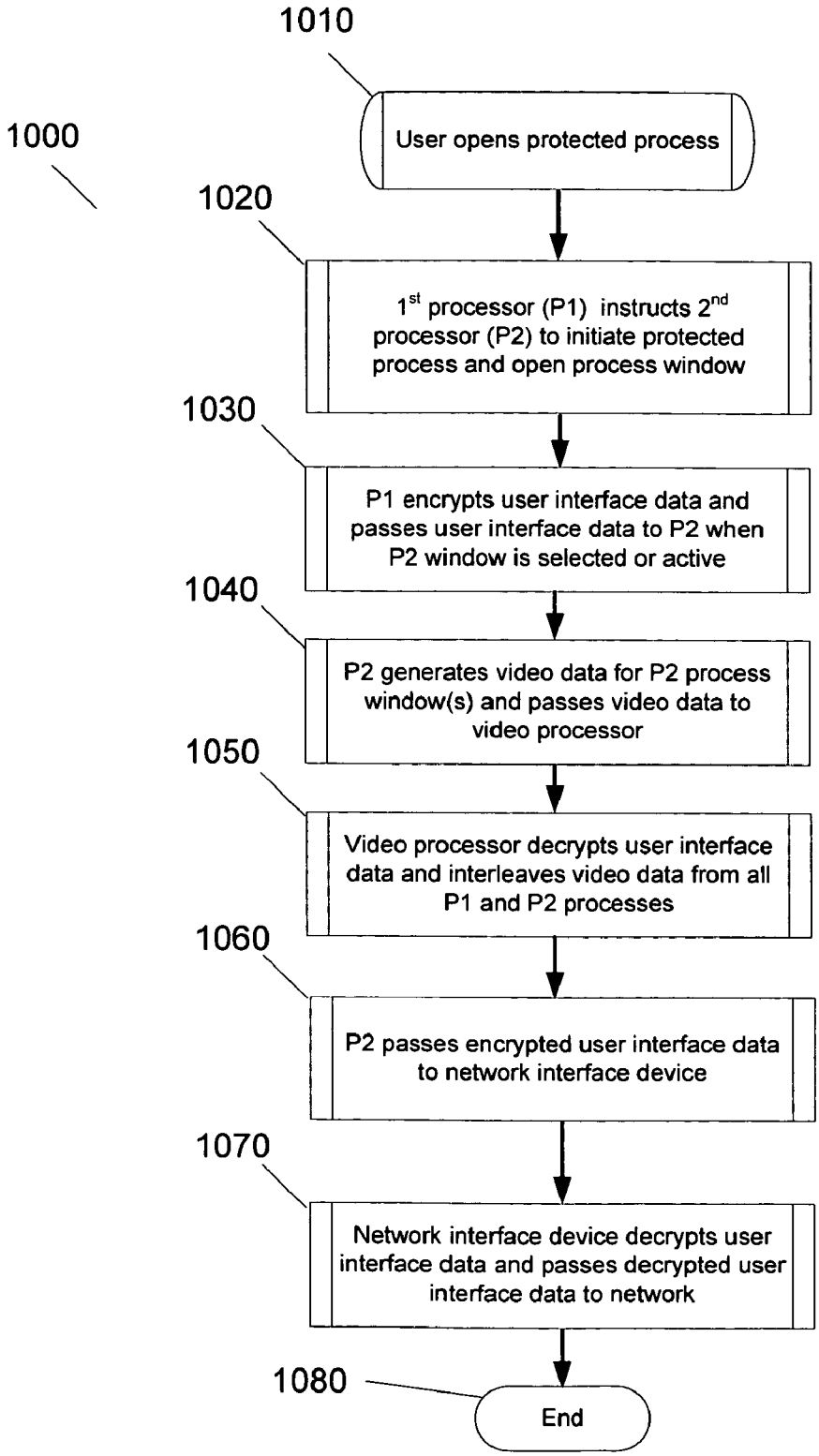
FIG. 10 illustrates a preferred embodiment of an exemplary protected process flow according to the principles of the present invention.

In accordance with a preferred embodiment of the present invention, an alternate configuration for computer system 100 is illustrated in FIG. 9. Computer system 100 comprises a video processor 970, processor 960, and a memory data storage area 950. Processor 960 may further comprise multiple processor cores, illustrated by $1^{st}$ processor 920 and $2^{nd}$ processor 940. It is understood that processor 960 may contain more than 2 processor cores. Microprocessors manufactured with multiple processor cores are becoming common in the industry, and such multi-core processors may be particularly advantageous when used in accordance with the present teachings. Memory data storage area 950 may further comprise $1^{st}$ memory data storage area 910 and $2^{nd}$ memory data storage area 930. Memory areas 910 and 930 may comprise, for example, different partitions on a single hard drive, and/or different address ranges in a RAM bank.

Referring again to FIG. 9, the functions carried out by processors 920 and 940 may comprise separate, secure logical processes executing on the same physical processor. For example, a first logical process may comprise executing instructions necessary to carry out the functions of an operating system, or the first logical process may comprise executing instructions necessary to carry out the functions of a first computer program, including but not limited to a word processor. A second logical process may comprise executing instructions necessary to carry out the functions of a web browser program, or may comprise executing instructions necessary to carry out the functions of an instant messenger program, for example. A computer system 100 constructed in accordance with the principles of the present invention would be capable of disallowing a secure logical process, such as the second logical process described above, access to certain memory spaces, and/or disallowing a secure logical process from initiating access to another logical process. For example, the functions carried out by P2 140 (FIG. 1) may comprise a secure logical process, which may be configured to be unable to automatically initiate access to either M1 110 or another logical process performing the functions of P1 120. Additionally, memory areas 910 and 930 may comprise separate, isolated memory zones within a common physical memory space, such as separate partitions within the same hard drive, for example.

Some malware programs are designed to secretly record user input commands (such as keystrokes, for example), then send the information back to a host computer. This type of malware is capable of stealing important user information, such as passwords, bank account numbers, social security numbers, driver's license numbers, credit account numbers, etc. Theft of such personal information could result in the theft of actual assets (money or securities, etc.) or perhaps used for identity theft, among other malicious intents. Clearly, a computer system capable of ensuring the protection of such sensitive information would be desirable.

In accordance with an embodiment of the present invention, a computer system is configured such that attempts by malware to record and report data entry by the computer user via input devices such as keyboards, mouse clicks, microphones, or any other data input devices are effectively blocked. Encryption of user input data, such as keystrokes, is an effective means of protecting such data from theft by malware. Specific techniques used for data encryption and decryption are well known in the art, and need not be discussed further here. There are many examples in the art that may be examined to better understand various encryption/decryption techniques and the use of encryption/decryption in computer systems. Among these are U.S. Pat. No. 6,581,162 entitled "Method for securely creating, storing and using encryption keys in a computer system." issued to Angelo, et al., and U.S. Pat. No. 6,134,661 entitled "Computer network security device and method." Issued to Topp. The aforementioned patents have been previously incorporated by reference.

In accordance with the present teachings, a method of operating a computer system involving data encryption is described. In step 1010, a user opens a protected process where some level of data encryption is desired, for example, the encryption of sensitive user interface data or user files. Other data may be encrypted as desired. At step 1020, processor P1 120 instructs processor P2 140 to initiate a protected process and open a process window. P1 120 encrypts the sensitive data and passes the user interface data to P2 140 when a P2 140 window is selected or active (step 1030). P2 140 generates video data for the P2 140 process window(s) and passes the video data to video processor 170 (step 1040). Video processor 170 decrypts the sensitive data and interleaves the video data from all P1 and P2 processes (step 1050). P2 140 passes the encrypted sensitive data to network interface device 190 (step 1060). Network interface device 190 decrypts the sensitive data and passes the decrypted sensitive data to network 195. Of course, other methods of operating a computer system in which data is encrypted prior to being passed to P2 140, and decrypted after leaving the control of P2 140, are within the spirit and scope of the present teachings.

In accordance with a preferred embodiment of the present invention, data desired to be protected is encrypted prior to sending the data to processor P2 140, which may be running one or more malware processes. Processor P2 140 does not have visibility to the decryption keys, and is therefore unable to decrypt the data. Data may be decrypted by network interface device 190 prior to forwarding the data on to network 195. Conversely, encrypted data may be sent directly over the network for decryption by another computer system, including, for example, an internet banking host computer. Decryption keys may be passed between P1 120 and network interface device 190 via a communication link 191. Video processor 170 may decrypt the data prior to displaying the data on video display 180, with decryption keys possibly passed between P1 120 and video processor 170 via a communication link 171. Conversely, data may be passed directly to video processor 170 via a communication link 151.

A user 160 may wish to encrypt just a portion of the data destined for the network, such as passwords, credit card numbers, etc. Conversely, a user may wish to encrypt large blocks of data, such as e-mails or large application files containing sensitive text and/or graphics. Instructions may be passed to network interface device 190 directing 190 to decrypt one or more specific data blocks prior to sending the data blocks to network 195. Conversely, instructions may be passed to network interface device 190 directing 190 to pass one or more specific data blocks to network 195 without decryption.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

[1. A method of operating a computer system having at least a first and second electronic data processor capable of executing instructions using a common operating system, comprising the steps of:

executing instructions in a first logical process within the common operating system using the first electronic data processor, wherein the first logical process is capable of accessing data contained in a first memory space and a second memory space;

executing instructions in a second logical process within the common operating system using the second electronic data processor, wherein the second logical process is capable of accessing data contained in the second memory space, the second logical process being further capable of exchanging data across a network of one or more computers;

displaying, in a windowed format on a display terminal, data from the first logical process and the second logical process, wherein a video processor is adapted to combine data from the first and second logical processes and transmit the combined data to the display terminal;

wherein the computer system is configured such that the second electronic data processor is operating in a protected mode and data residing on the first memory space is protected from corruption by a malware process downloaded from the network and executing as part of the second logical process.]

[2. The method of claim 1 wherein the first memory space and the second memory space comprise separate regions of a common memory space.]

[3. The method of claim 1 wherein the second logical process is selected from the group consisting of; an electronic mail process, an instant messaging process, an internet browser process, an interactive gaming process, a virtual private network (VPN) process, and a reader application process.]

[4. The method of claim 1 wherein the first logical process receives user interface data, and passes the user interface data to the second logical process.]

[5. The method of claim 1 wherein the first and second electronic data processors are part of a multi-core electronic data processor.]

[6. The method of claim 1 and further comprising the step of restoring at least one corrupted data file residing on the second memory space from an image residing on the first memory space.]

[7. The method of claim 1 and further comprising the step of automatically deleting at least one data file residing on the second memory space when the second logical process is terminated.]

[8. The method of claim 1 and further comprising the steps of:

encrypting data with the first logical process;

transferring the encrypted data from the first logical process to the second logical process;

transferring the encrypted data from the second logical process to the network interface device.]

[9. The method of claim 8 and further comprising the steps of:

decrypting the data with the network interface device;

transferring the decrypted data from the network interface device to the network.]

[10. A multi-processor computer system using a common operating system, comprising:

a first electronic data processor capable of executing instructions using the common operating system and communicatively coupled to a first memory space and a second memory space;

a second electronic data processor capable of executing instructions using the common operating system and communicatively coupled to the second memory space and to a network interface device, wherein the second electronic data processor is capable of exchanging data across a network of one or more computers via the network interface device;

a video processor adapted to combine video data from the first and second electronic data processors and transmit the combined video data to a display terminal for displaying the combined video data in a windowed format;

wherein the computer system is configured such that the second electronic data processor is operating in a protected mode and data residing on the first memory space is protected from corruption by a malware process downloaded from the network and executing on the second electronic data processor.]

[11. The computer system of claim 10 wherein the first memory space and the second memory space comprise separate regions of a common memory space.]

[12. The computer system of claim 10 wherein the first and second electronic data processors are part of a dual processor computer system.]

[13. The computer system of claim 10 wherein the second electronic data processor and the video processor are co-located on a circuit card, the circuit card being communicatively coupled to the first electronic data processor.]

[14. The computer system of claim 10 wherein the computer system is configured such that the first electronic data processor is protected from executing instructions initiated by a malware process downloaded from the network and executing on the second electronic data processor.]

[15. A multi-processor computer system using a common operating system, comprising:

at least a first and second electronic data processor capable of executing instructions using the common operating system;

at least a first and second memory space;

a video processor;

wherein the first and second electronic data processors, first and second memory space, and video processor are configured for performing the steps of:

executing instructions in a first logical process with the first electronic data processor, wherein the first logical process is executing within the common operating system and is capable of accessing data contained in the first memory space and the second memory space;

executing instructions in a second logical process with the second electronic data processor, wherein the second logical process is executing within the common operating system and is capable of accessing data contained in the second memory space, the second logical process being further capable of exchanging data across a network of one or more computers;

displaying, in a windowed format on a display terminal, data from the first logical process and the second logical process, wherein the video processor is adapted to combine data from the first and second logical processes and transmit the combined data to the display terminal;

wherein the computer system is configured such that the second electronic data processor is operating in a protected mode and data residing on the first memory space is protected from corruption by a malware process downloaded from the network and executing as part of the second logical process.]

[16. The computer system of claim 15 wherein the computer system is further configured such that the first logical process is protected from executing instructions initiated by a malware process downloaded from the network and executing as part of the second logical process.]

[17. The computer system of claim 15 and further comprising: at least one network interface device capable of exchanging data with both the second logical process and with the network.]

[18. The computer system of claim 17 wherein the network interface device is capable of decrypting data received from the second logical process and transmitting the decrypted data to the network while preventing the second logical process from accessing the decrypted data.]

[19. The computer system of claim 15 wherein the at least one electronic data processor is selected from the group consisting of: a multi-core electronic data processor; dual electronic data processors; and multiple electronic data processors.]

[20. The computer system of claim 15 and further configured for performing the step of: restoring at least one corrupted data file residing on the second memory space from an image residing on the first memory space.]

*21. A portable computer based system capable of executing instructions using a common operating system and protect critical files from malicious attacks via a network of one or more computers, comprising:*

*a first logical process capable of executing instructions within the common operating system using at least one electronic data processor and further capable of accessing a first memory space, wherein the first memory space contains at least one critical file; and*

*at least one secure browser process capable of executing instructions within the common operating system using the at least one electronic data processor and further capable of accessing a second memory space;*

*the first logical process configured to:*

*accept data entry from a computer user;*

*initialize the at least one secure browser process; and*

*pass data to the at least one secure browser process;*

*the at least one secure browser process configured to:*

*execute instructions from a process potentially containing malware downloaded from the network of one or more computers;*

*access data contained in the second memory space, wherein the process potentially containing malware is capable of accessing the second memory space but is denied access to the first memory space;*

*store at least one temporary internet file on the first or second memory space;*

*block the process potentially containing malware from modifying search requests when accessing a search engine; and*

*generate website video data for display;*

*wherein the portable computer based system is configured such that the at least one critical file residing on the first memory space is protected from corruption by the process potentially containing malware downloaded from the network and executing as part of the at least one secure browser process;*

*wherein the portable computer based system is configured such that the at least one temporary internet file is automatically deleted upon closing the at least one secure browser process.*

*22. The portable computer based system of claim 21 further comprising a cell phone communication capability.*

*23. The portable computer based system of claim 21 wherein the first logical process is further configured to directly exchange data with a network interface device and with the at least one secure browser process.*

*24. The portable computer based system of claim 21 wherein the first logical process is further configured to pass data downloaded from the network to the at least one secure browser process.*

*25. The portable computer based system of claim 21 wherein the at least one secure browser process is further configured to directly exchange data with a network interface device and with the first logical process.*

*26. The portable computer based system of claim 21 wherein attempts by malware to record data entry by the computer user are blocked.*

*27. The portable computer based system of claim 21 wherein attempts by malware to transmit data entry by the computer user to the network are blocked.*

*28. The portable computer based system of claim 21 wherein the first logical process is further configured to initialize a plurality of secure browser processes.*

*29. The portable computer based system of claim 21 wherein the first logical process is further configured to execute instructions on a first core of the at least one elec-*

*tronic data processor and the at least one secure browser process is further configured to execute instructions on a second core of the at least one electronic data processor.*

*30. The portable computer based system of claim 21 further configured to automatically scan a process, compare the process with an allowed process list and alert the computer user that a possible malware infection has occurred if the process is not on the allowed process list.*

*31. The portable computer based system of claim 21 further configured to download a file potentially infected with malware from the network and store the file on the second memory space, initiate a transfer of the file from the second memory space to the first memory space, scan the file for malware, complete the transfer of the file from the second memory space to the first memory space if no malware is detected as a result of the scan and alert the computer user if malware is detected as a result of the scan.*

*32. The portable computer based system of claim 21 configured to receive a data file to download selected by the computer user and alert the computer user if malware is suspected in the data file.*

*33. The portable computer based system of claim 21 wherein at least one file corrupted by the process potentially containing malware is capable of being restored from a protected image.*

*34. The portable computer based system of claim 33 wherein the protected image is stored at a location selected from the group consisting of:*

*a removable drive;*

*the first memory space;*

*a partition on a memory device; and*

*a memory storage medium.*

*35. The portable computer based system of claim 21 wherein the at least one secure browser process is further configured to be initialized from clean system files.*

*36. The portable computer based system of claim 21 wherein user input data is encrypted prior to being sent over the network.*

*37. The portable computer based system of claim 21 wherein the first logical process is a browser process.*

*38. A method of operating a portable computer based system capable of executing instructions using a common operating system and protect critical files from malicious attacks via a network of one or more computers, comprising:*

*executing instructions in a first logical process within the common operating system using at least one electronic data processor and accessing a first memory space, wherein the first memory space contains at least one critical file;*

*executing instructions in at least one secure browser process within the common operating system using the at least one electronic data processor and accessing a second memory space;*

*accepting data entry from a computer user in the first logical process;*

*initializing the at least one secure browser process in the first logical process;*

*passing data to the at least one secure browser process in the first logical process;*

*executing instructions from a process potentially containing malware downloaded from the network of one or more computers in the at least one secure browser process;*

*accessing data contained in the second memory space in the at least one secure browser process, wherein the process potentially containing malware accesses the second memory space but is denied access to the first memory space;*

*storing at least one temporary internet file on the first or second memory space in the at least one secure browser process;*

*blocking the process potentially containing malware from modifying search requests when accessing a search engine in the at least one secure browser process; and*

*generating website video data for display in the at least one secure browser process;*

*wherein the portable computer based system is configured such that the at least one critical file residing on the first memory space is protected from corruption by the process potentially containing malware downloaded from the network and executing as part of the at least one secure browser process;*

*wherein the portable computer based system is configured such that the at least one temporary internet file is automatically deleted upon closing the at least one secure browser process.*

*39. The method of claim 38 wherein said portable computer based system comprises a cell phone communication capability.*

*40. The method of claim 38 further comprising directly exchanging data between the first logical process and a network interface device and the at least one secure browser process.*

*41. The method of claim 38 further comprising passing data downloaded from the network from the first logical process passes to the at least one secure browser process.*

*42. The method of claim 38 further comprising directly exchanging data between the at least one secure browser process and a network interface device and the first logical process.*

*43. The method of claim 38 further comprising blocking attempts by malware to record data entry by the computer user.*

*44. The method of claim 38 further comprising blocking attempts by malware to transmit data entry by the computer user to the network.*

*45. The method of claim 38 further comprising initializing a plurality of secure browser processes in the first logical process.*

*46. The method of claim 38 further comprising executing instructions on a first core of the at least one electronic data processor in the first logical process and executing instructions on a second core of the at least one electronic data processor in the at least one secure browser process.*

*47. The method of claim 38 further comprising automatically scanning a process, comparing the process with an allowed process list and alerting the computer user that a possible malware infection has occurred if the process is not on the allowed process list.*

*48. The method of claim 38 further comprising downloading a file potentially infected with malware from the network and storing the file on the second memory space, initiating a transfer of the file from the second memory space to the first memory space, scanning the file for malware, completing the transfer of the file from the second memory space to the first memory space if no malware is detected as a result of the scanning and alerting the computer user if malware is detected as a result of the scan.*

*49. The method of claim 38 further comprising receiving a data file to download selected by the computer user and alerting the computer user if malware is suspected in the data file.*

*50. The method of claim 38 further comprising restoring at least one file corrupted by the process potentially containing malware from a protected image.*

*51. The method of claim 50 wherein the protected image is stored at a location selected from the group consisting of:*

*a removable drive;*

*the first memory space;*

*a partition on a memory device; and*

*a memory storage medium.*

*52. The method of claim 38 further comprising initializing the at least one secure browser process from clean system files.*

*53. The method of claim 38 further comprising encrypting user input data prior to being sent over the network.*

*54. The portable computer based system of claim 21 wherein the first logical process is a browser process.*

*55. A computer program product comprising a program code stored in a non-transitory computer readable medium operable on a portable computer based system capable of executing instructions using a common operating system and protect critical files from malicious attacks via a network of one or more computers, configured to:*

*execute instructions in a first logical process within the common operating system using at least one electronic data processor and further configured to access a first memory space, wherein the first memory space contains at least one critical file;*

*execute instructions in at least one secure browser process within the common operating system using the at least one electronic data processor and further configured to access a second memory space;*

*accept data entry from a computer user in the first logical process;*

*initialize the at least one secure browser process in the first logical process;*

*pass data to the at least one secure browser process in the first logical process;*

*execute instructions from a process potentially containing malware downloaded from the network of one or more computers in the at least one secure browser process;*

*access data contained in the second memory space in the at least one secure browser process, wherein the process potentially containing malware is configured to access the second memory space but is denied access to the first memory space;*

*store at least one temporary internet file on the first or second memory space in the at least one secure browser process;*

*block the process potentially containing malware from modifying search requests when accessing a search engine in the at least one secure browser process; and*

*generate website video data for display in the at least one secure browser process;*

*wherein the portable computer based system is configured such that the at least one critical file residing on the first memory space is protected from corruption by the process potentially containing malware downloaded from the network and executing as part of the at least one secure browser process;*

*wherein the portable computer based system is configured such that the at least one temporary internet file is automatically deleted upon closing the at least one secure browser process.*

*56. The computer program product of claim 55 wherein the portable computer based system further comprises a cell phone communication capability.*

*57. The computer program product of claim 55 wherein the program code stored in the non-transitory computer readable medium is further configured to cause the first logical process to directly exchange data with a network interface device and with the at least one secure browser process.*

*58. The computer program product of claim 55 wherein the program code stored in the non-transitory computer readable medium is further configured to cause the first logical process to pass data downloaded from the network to the at least one secure browser process.*

*59. The computer program product of claim 55 wherein the program code stored in the non-transitory computer readable medium is further configured to cause the at least one secure browser process to directly exchange data with a network interface device and with the first logical process.*

*60. The computer program product of claim 55 wherein the program code stored in the non-transitory computer readable medium is further configured to block attempts by malware to record data entry by the computer user.*

*61. The computer program product of claim 55 wherein the program code stored in the non-transitory computer readable medium is further configured to block attempts by malware to transmit data entry by the computer user to the network.*

*62. The computer program product of claim 55 wherein the program code stored in the non-transitory computer readable medium is further configured to initialize a plurality of secure browser processes in the first logical process.*

*63. The computer program product of claim 55 wherein the program code stored in the non-transitory computer readable medium is further configured to execute instructions on a first core of the at least one electronic data processor in the first logical process and execute instructions on a second core of the at least one electronic data processor in the at least one secure browser process.*

*64. The computer program product of claim 55 wherein the program code stored in the non-transitory computer readable medium is further configured to automatically scan a process, compare the process with an allowed process list and alert the computer user that a possible malware infection has occurred if the process is not on the allowed process list.*

*65. The computer program product of claim 55 wherein the program code stored in the non-transitory computer readable medium is further configured to download a file potentially infected with malware from the network and store the file on the second memory space, initiate a transfer of the file from the second memory space to the first memory space, scan the file for malware, complete the transfer of the file from the second memory space to the first memory space if no malware is detected as a result of the scan and alert the computer user if malware is detected as a result of the scan.*

*66. The computer program product of claim 55 wherein the program code stored in the non-transitory computer readable medium is further configured to receive a data file to download selected by the computer user and alert the computer user if malware is suspected in the data file.*

*67. The computer program product of claim 55 wherein the program code stored in the non-transitory computer readable medium is further configured to restore at least one file corrupted by the process potentially containing malware from a protected image.*

*68. The computer program product of claim 67 wherein the protected image is stored at a location selected from the group consisting of:*

*a removable drive;*

*the first memory space;*

*a partition on a memory device; and*

*a memory storage medium.*

*69. The computer program product of claim 55 wherein the program code stored in the non-transitory computer readable medium is further configured to initialize the at least one secure browser process from clean system files.*

*70. The computer program product of claim 55 wherein the program code stored in the non-transitory computer readable medium is further configured to encrypt user input data prior to being sent over the network.*

*71. The computer program product of claim 55 wherein the first logical process is a browser process.*

* * * * *